（12） United States Patent
Nasu

(10) Patent No.: US 11,300,437 B2
(45) Date of Patent: Apr. 12, 2022

(54) FEED DRIVE MECHANISM, DISPENSER INCLUDING FEED DRIVE MECHANISM, CUSTOMIZING DISPENSING SYSTEM INCLUDING DISPENSER, AND FEED DRIVE METHOD IN FEED DRIVE MECHANISM

(71) Applicant: SHISEIDO COMPANY, LTD., Tokyo (JP)

(72) Inventor: Mieko Nasu, Tokyo (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 0 days.

(21) Appl. No.: 17/273,022

(22) PCT Filed: Aug. 28, 2019

(86) PCT No.: PCT/JP2019/033752
§ 371 (c)(1),
(2) Date: Mar. 3, 2021

(87) PCT Pub. No.: WO2020/054427
PCT Pub. Date: Mar. 19, 2020

(65) Prior Publication Data
US 2021/0325225 A1  Oct. 21, 2021

(30) Foreign Application Priority Data

Sep. 10, 2018  (JP) .............................. JP2018-169201

(51) Int. Cl.
*G01F 11/02*    (2006.01)
*A47K 5/18*     (2006.01)
(Continued)

(52) U.S. Cl.
CPC .............. *G01F 11/024* (2013.01); *A47K 5/18* (2013.01); *F16H 37/065* (2013.01); *F16H 19/04* (2013.01)

(58) Field of Classification Search
CPC ...... A45D 40/26; A45D 44/005; A45D 40/00; B01F 13/1066; B01F 5/0647;
(Continued)

(56) References Cited

U.S. PATENT DOCUMENTS

| 5,150,821 A * | 9/1992 | Iwasaki | G01N 35/10 |
| | | | 222/132 |
| 8,448,823 B2 * | 5/2013 | Engels | B01F 13/1066 |
| | | | 222/144 |

(Continued)

FOREIGN PATENT DOCUMENTS

| JP | 2000-072190 | 3/2000 |
| JP | 2003-156106 | 5/2003 |

(Continued)

OTHER PUBLICATIONS

International Search Report for PCT/JP2019/033752 dated Nov. 19, 2019.

*Primary Examiner* — Vishal Pancholi
*Assistant Examiner* — Robert K Nichols, II
(74) *Attorney, Agent, or Firm* — IPUSA, PLLC

(57) ABSTRACT

A feed drive mechanism includes multiple feed containers configured to feed contents with rotation of rotatable feed tubes provided in lower portions of container tubes containing the contents, multiple gears connected to the feed tubes of the feed containers, and a single drive gear configured to mesh with the gears. The drive gear is configured to selectively mesh with and rotate the gears to cause the feed containers to feed the contents with timing that differs between the feed containers.

11 Claims, 26 Drawing Sheets

(51) Int. Cl.
  *F16H 37/06*  (2006.01)
  *F16H 19/04*  (2006.01)

(58) Field of Classification Search
  CPC .............. B01F 13/1063; B01F 15/0237; B01F
      5/0641; B01F 5/0698; G01J 3/46; G01F
      11/024; A47K 5/18; F16H 37/065; F16H
      19/04; B05B 12/02; B05B 12/14; B05B
              12/1409; B65D 83/68
  USPC ..... 222/1, 63, 129.1, 132, 167, 252, 278, 71
  See application file for complete search history.

(56) References Cited

U.S. PATENT DOCUMENTS

| | | | |
|---|---|---|---|
| 2014/0319238 A1* | 10/2014 | Su | A45D 34/00 239/70 |
| 2016/0052007 A1 | 2/2016 | Fuller et al. | |
| 2017/0340087 A1 | 11/2017 | Samain et al. | |
| 2017/0367462 A1 | 12/2017 | Samain et al. | |

FOREIGN PATENT DOCUMENTS

| | | |
|---|---|---|
| JP | 2008-162609 | 7/2008 |
| JP | 2011-136698 | 7/2011 |
| JP | 2015-224066 | 12/2015 |
| JP | 2017-537699 | 12/2017 |
| JP | 2018-504327 | 2/2018 |

\* cited by examiner

CONVENTIONAL EXAMPLE

[STATE (a)]

[STATE (a)]

[STATE (b)]

[STATE (d)]

[STATE (d)]

[STATE (e)]

[STATE (e)]

[STATE (f)]

[STATE (f)]

FEED DRIVE MECHANISM, DISPENSER INCLUDING FEED DRIVE MECHANISM, CUSTOMIZING DISPENSING SYSTEM INCLUDING DISPENSER, AND FEED DRIVE METHOD IN FEED DRIVE MECHANISM

TECHNICAL FIELD

The present invention relates to a feed drive mechanism configured to customize and dispense multiple kinds of contents, a dispenser including the feed drive mechanism, a customizing dispensing system including the dispenser, and a feed drive method in the feed drive mechanism.

BACKGROUND ART

In recent years, systems that customize and dispense multiple cosmetic products have been proposed. According to these systems, multiple cosmetic products are each time dispensed with their colors, textures, etc., being customized.

According to Patent Document 1, motors and gears are aligned with cartridges provided above as a drive mechanism for such systems.

According to Patent Document 2, as illustrated in FIG. 1, cells 901 and 902 and motors 911 and 912, which are a drive source, and cartridges 951 are alternately arranged adjacent to each other in a dispenser 900.

PRIOR ART DOCUMENT

Patent Document

Patent Document 1: U.S. Pat. App. Pub. No. 2016/0052007

Patent Document 2: Japanese Laid-Open Pat. Pub. No. 2017-537699

SUMMARY OF THE INVENTION

Problems to be Solved by the Invention

According to Patent Document 1 and Patent Document 2, however, in order to provide motors one for each of the cartridges containing respective cosmetic products of multiple kinds, as many motors as the cartridges are required. Furthermore, in order to provide as many motors in a limited housing space, when the number of cartridges increases by three or more, small, inexpensive motors are installed as individual motors so as to reduce the cost of components against the increase in the number of motors.

Therefore, in view of the above-noted circumstances, the present invention has an object of providing a feed drive mechanism configured to feed multiple contents that can reduce the cost of components.

Means for Solving the Problems

To solve the above-described problem, according to an embodiment of the present invention, a feed drive mechanism including multiple feed containers configured to feed contents with rotation of rotatable feed tubes provided in lower portions of container tubes containing the contents, multiple gears connected to the feed tubes of the feed containers, and a single drive gear configured to engage with the gears, wherein the drive gear is configured to selectively mesh with and rotate the gears to cause the feed containers to feed the contents with timing that differs between the feed containers, is provided.

Effects of the Invention

According to an embodiment, the cost of components can be reduced in a feed drive mechanism configured to feed multiple contents.

EMBODIMENTS OF THE INVENTION

Figure 1:
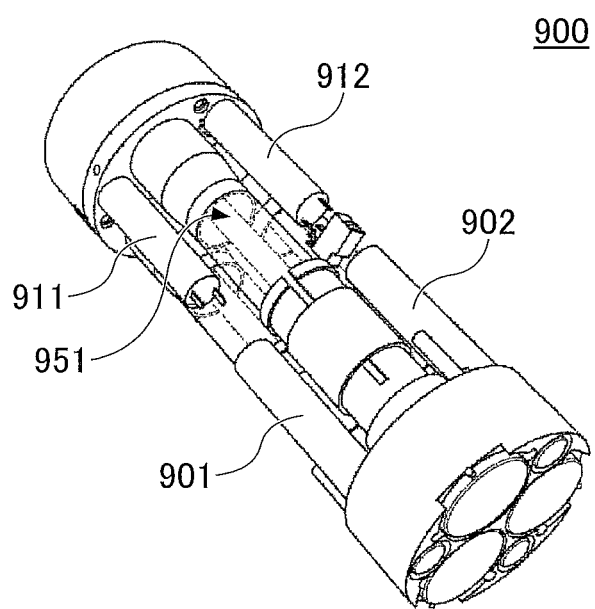
FIG. 1 is a perspective view illustrating motor and cartridge positions in a feed drive mechanism of a conventional example.

Embodiments of the present invention are described below with reference to the drawings. In the following, the same components are referred to using the same reference numerals in the drawings, and a duplicate description thereof may be omitted.

The present invention relates to a feed drive mechanism configured to customize and dispense multiple kinds of contents, a dispenser including the feed drive mechanism, a customizing dispensing system including the dispenser, and a feed drive method in the feed drive mechanism. Feed containers provided in a feed drive mechanism of the present invention can contain, as contents, highly viscous fluid (liquid) or paste, of which examples include cosmetics (basic cosmetics, base makeup cosmetics, and point makeup cosmetics), liquid soap, toothpaste, kneaded perfumes, and condiments.

<Feed Drive Mechanism>

Figure 2:
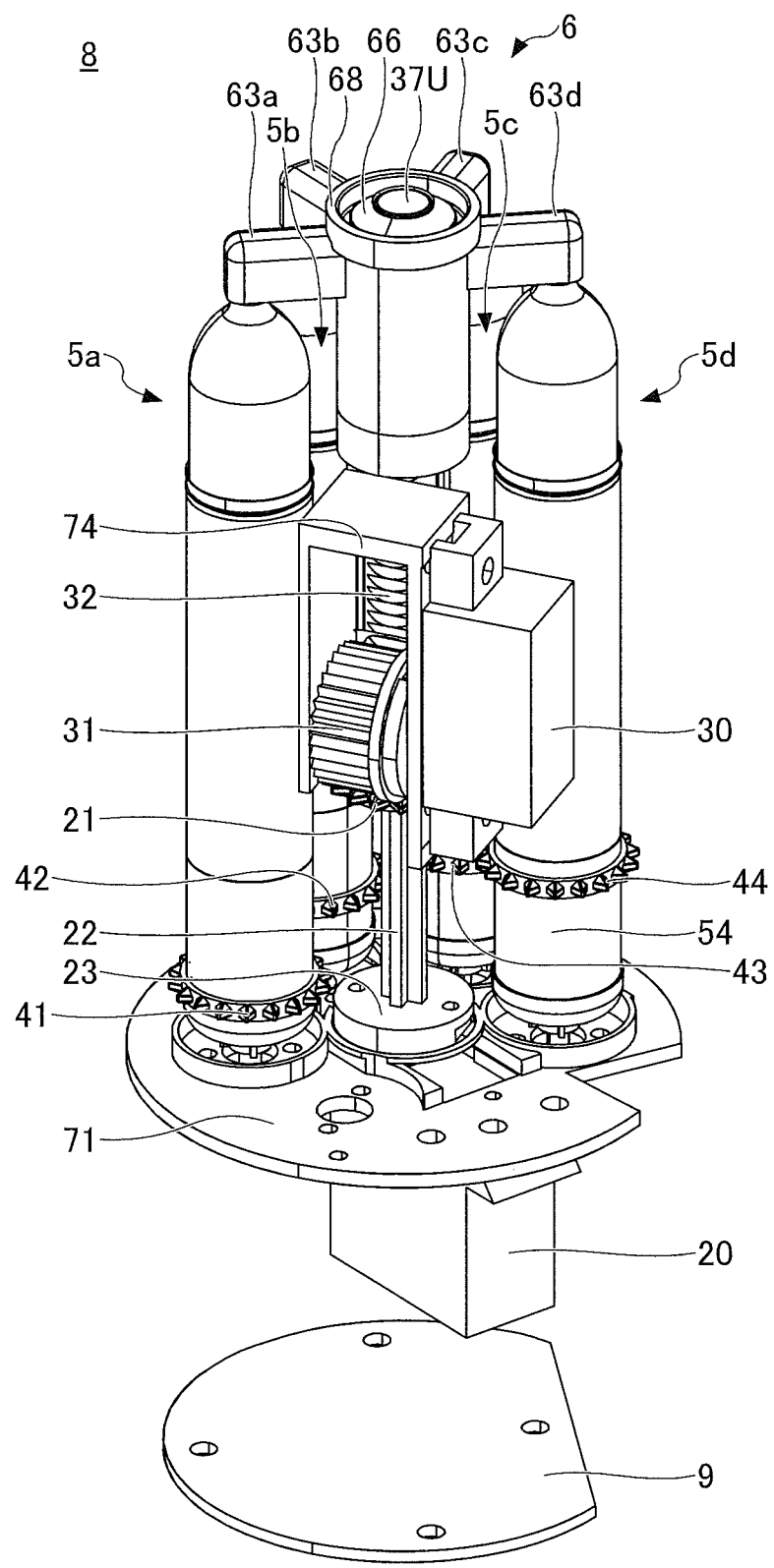
FIG. 2 is a perspective view of a feed drive mechanism according to a first embodiment of the present invention.
Figure 3:
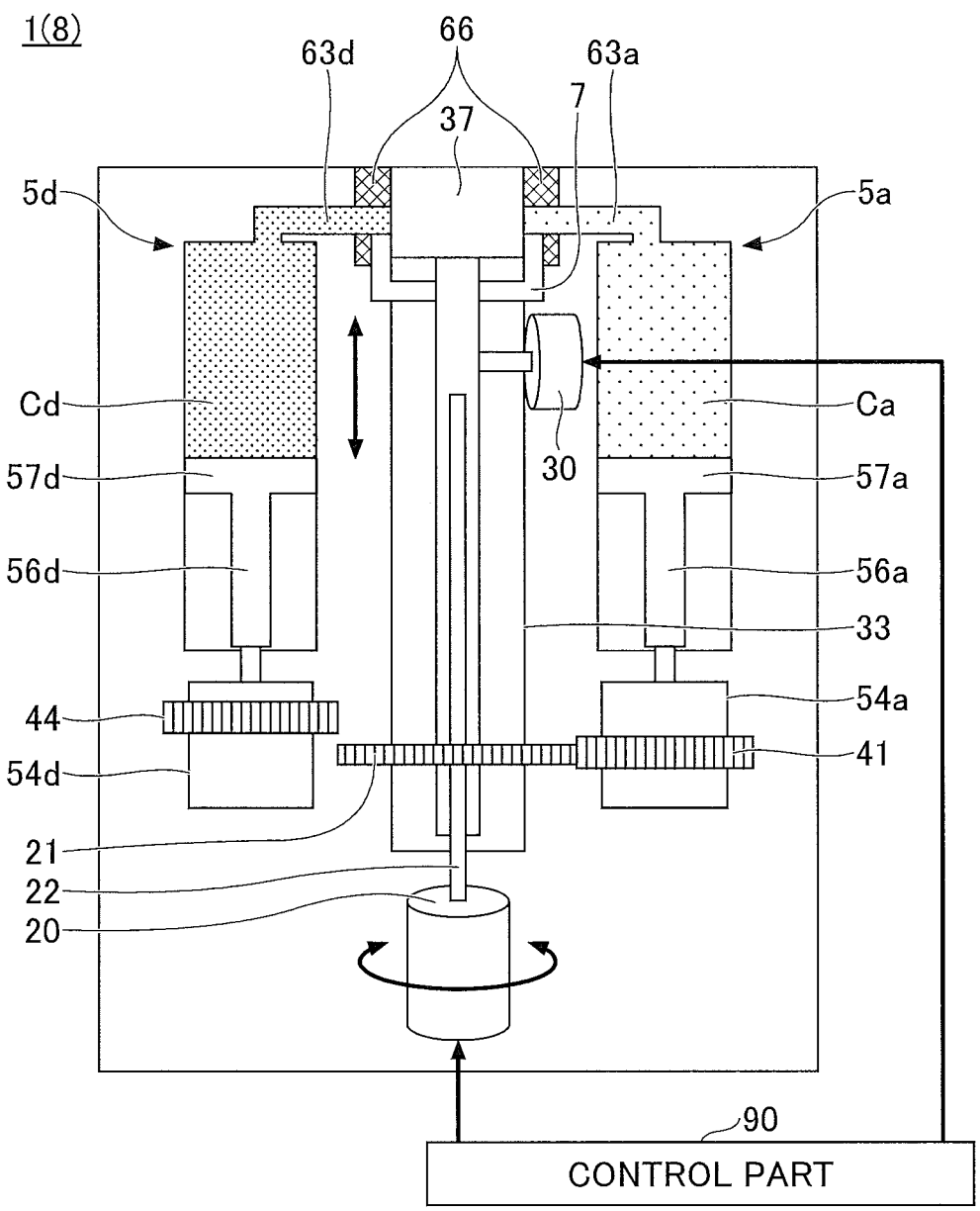
FIG. 3 is a schematic diagram of the feed drive mechanism according to the first embodiment of the present invention.
Figure 4:
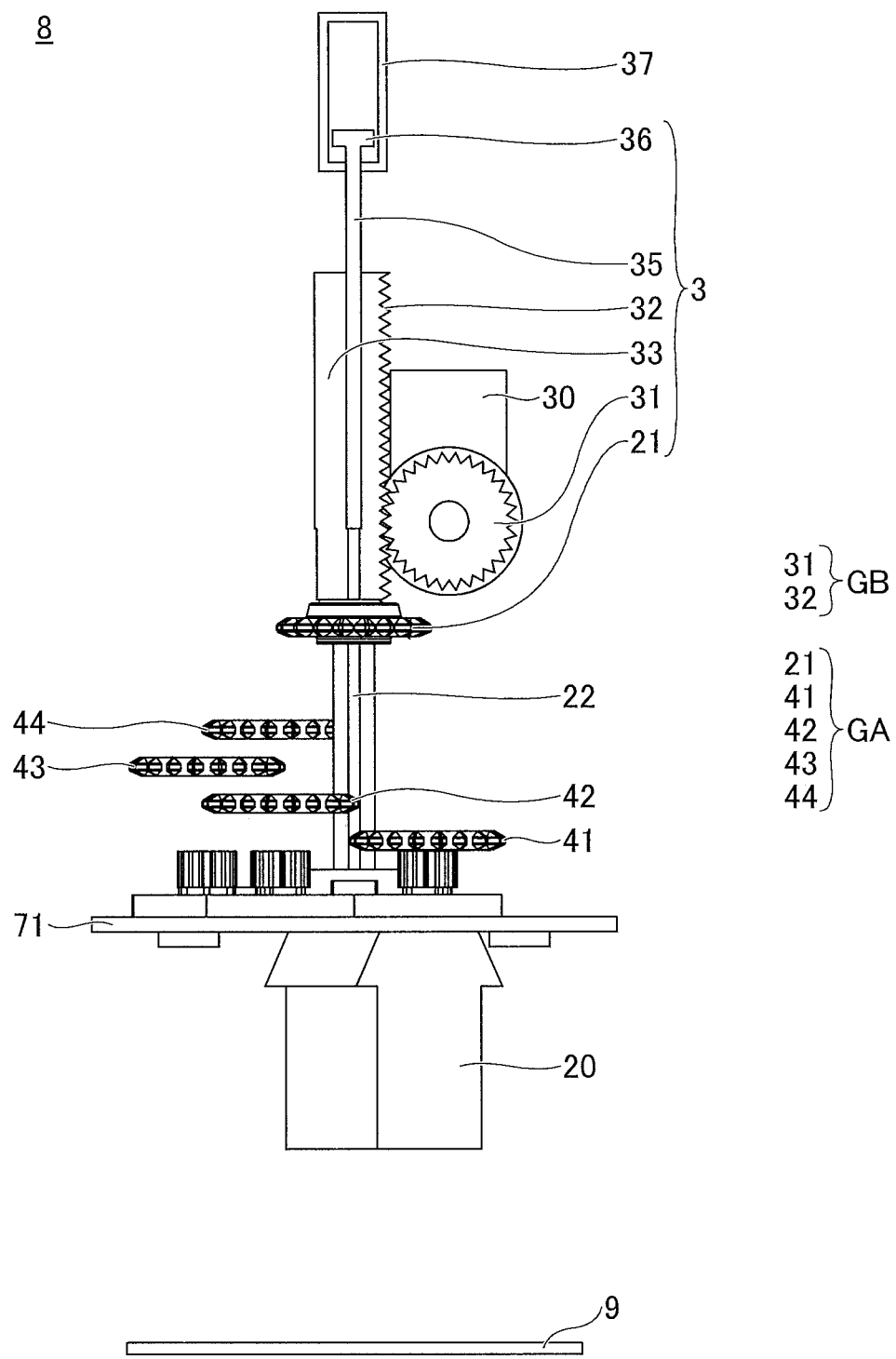
FIG. 4 is a side view of the feed drive mechanism according to the first embodiment, illustrating its gear and motor arrangement.

FIG. 2 is a perspective view illustrating a feed drive mechanism 8 according to a first embodiment of the present invention. FIG. 3 is a schematic diagram of the feed drive mechanism 8 of the first embodiment. FIG. 4 is a side view of the feed drive mechanism 8 of the first embodiment, illustrating its gear and motor arrangement.

A schematic configuration of the feed drive mechanism 8 of the first embodiment is described with reference to FIGS. 2, 3 and 4. The feed drive mechanism 8 is a drive mechanism provided in a device case 10 (see FIG. 8) described below. The feed drive mechanism 8 includes a single drive gear 21 in the center, a pinion gear 31, a rack gear 32, an extrusion piston 37, multiple driven gears 41, 42, 43 and 44, multiple feed containers 5a through 5d, and a cylinder part 6.

The feed containers 5a through 5d are configured to feed contents upward with the rotations of operating tubes (feed tubes) 54a through 54d, which are rotatable feeding means provided at the bottom of the containers.

The contents contained in the feed containers 5a through 5d are, for example, cosmetics of four different colors, which are cyan, magenta, yellow, and white cosmetics used as point cosmetics or the like.

The driven gears 41, 42, 43 and 44 engage with the peripheries of the operating tubes 54, which are the feeding means of the feed containers 5a, 5b, 5c and 5d. The driven gears 41, 42, 43 and 44 are at different heights (heights from a support plate 71). The drive gear 21 is provided at the center of the driven gears 41, 42, 43 and 44.

Referring to FIG. 4, the engagement of the drive gear 21 with any of the driven gears 41, 42, 43 and 44 constitutes a selective spur gear mechanism GA.

Furthermore, the vertically extending rack gear 32 and the pinion gear 31 at a fixed height constitute a rack and pinion mechanism GB. The rack gear 32 is configured to vertically move by meshing with the pinion gear 31 and rotating.

A central tube 33 vertically extends. The rack gear 32 is provided in a side surface of the central tube 33. A piston rod 35 is integrally formed with the central tube 33 in its upper portion (see FIG. 4).

Referring to FIGS. 2 and 4, the drive gear 21 is held at the bottom of the central tube 33 to be rotatable relative to the central tube 33 and the rack gear 32.

The piston rod 35, an inner piston 36 at the upper end of the piston rod 35, the central tube 33 provided with the rack gear 32, and the drive gear 21, which move up and down together as a unit as the rack gear 32 meshing with the pinion gear 31 moves up and down with the driving of the pinion gear 31, may be referred to as a central elevator 3.

Furthermore, as illustrated in FIG. 2, the cylinder part 6 is provided on top of the central tube 33. Multiple nozzles 63a through 63d are provided on a side surface of the cylinder part 6 in such a manner as to extend outward.

A through hole is formed in the central tube portion of the cylinder part 6. The extrusion piston 37 (see FIG. 4) is inserted into the through hole. In FIG. 2, only an upper end 37U of the extrusion piston 37 is visible.

In the cylinder part 6, depending on the position of the extrusion piston 37, the contents fed from the feed containers 5a through 5d may be able to flow into the central through hole.

The extrusion piston 37 moves in some cases and does not move in other cases together with the central elevator 3. A configuration of the extrusion piston 37 and the central elevator 3 is described with reference to FIGS. 5 and 7.

Furthermore, as illustrated in FIG. 2, the cylinder part 6 has a substantially tubular shape except for the nozzles 63a through 63d, and includes an outer tube portion including a thin tubular part 67 (see FIG. 5) that is a tube portion on the outer side, and an upper part 66. An annularly rising annular protrusion 68 is provided on the upper surface of the upper part 66. An internal configuration of the cylinder part 6 is described in detail with reference to FIG. 5.

Furthermore, the feed drive mechanism 8 includes a feed drive motor 20 that is a first drive source to rotate the drive gear 21 and an elevation drive motor 30 that is a second drive source to rotate the pinion gear 31.

As illustrated in FIG. 2, the elevation drive motor 30 and the pinion gear 31 are supported by a pinion enclosure part 74.

Furthermore, a transmission shaft 22 vertically extends below the drive gear 21 to engage with the inner curved surface of the drive gear 21 to transmit a torque from the feed drive motor 20 to the drive gear 21. A support disk 23 that supports the transmission shaft 22 is provided at the lower end of the transmission shaft 22.

Furthermore, the support plate 71 is provided under the support disk 23 and the feed containers 5a through 5d. The feed drive motor 20 is provided under the support plate 71. Therefore, the output shaft of the feed drive motor 20 is connected to the transmission shaft 22 across the support plate 71.

Furthermore, a control board 9 is provided below the support plate 71. A control part 90 (see FIG. 3) that controls the driving of the feed drive motor 20 and the elevation drive motor 30 is provided on the control board 9.

Referring to FIGS. 3 and 4, the drive gear 21 selectively meshes with and rotate one of the driven gears 41, 42, 43 and 44, so that the feed containers 5a through 5d differ in timing to feed respective different contents. While FIG. 3, which is a schematic diagram, illustrates the example of feeding two kinds of contents Ca and Cd using the two feed containers 5a and 5d, the feed drive mechanism 8 differs in timing in feeding different contents with respect to two or more feed containers.

In the case of adjusting the height of the drive gear 21, which is part of the central elevator 3 provided with the rack gear 32, by raising or lowering the rack gear 32 with the driving of the pinion gear 31, it is preferable to perform such adjusting when the drive gear 21 is not rotated.

Figure 5:
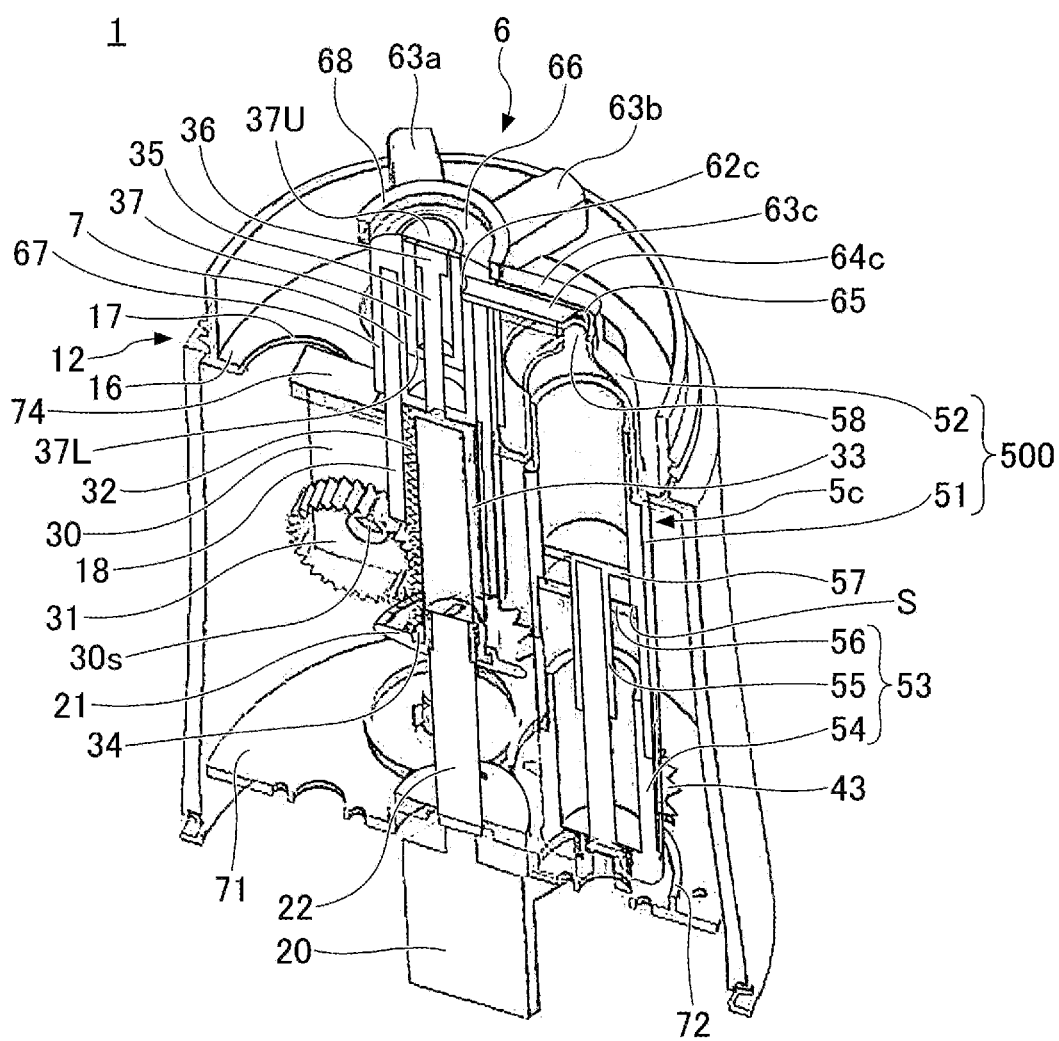
FIG. 5 is a side sectional view illustrating an internal configuration of a central elevator and a feed container according to the first embodiment.

Next, an internal configuration of a feed container and a detailed configuration of an elevation mechanism are described using FIG. 5. FIG. 5 is a side sectional view illustrating an internal configuration of the central elevator 3 and a feed container according to the first embodiment of the present invention.

FIG. 5 illustrates a section in the state where a tube portion case 12 including a beam part 16 is attached to the outside and the three feed containers 5a, 5b and 5e other than the feed container 5c are removed compared with FIG. 2. It is assumed that the feed containers 5a, 5b and 5d have the same configuration as the feed container 5c as illustrated in FIG. 5. In the following, an English letter for distinction purposes at the end of a reference numeral may be omitted except in the case of identifying the kind of a content.

As illustrated in FIG. 5, the feed container 5 includes a body tube 51 having a side surface, a head part 52 capping the upper end of the body tube 51, and a feed part 53. The body tube 51 and the head part 52 correspond to a container tube 500.

A feed piston 57 is provided in the body tube 51 in such a manner as to be vertically movable in the body tube 51.

A space enclosed by part of the body tube 51 on the upper side of the feed piston 57 and the head part 52 serves as a filling area to be filled with a content. The feed part 53 is fit into a lower portion of the body tube 51, and rotates relative to the container tube 500 to raise the feed piston 57 to reduce the internal volume of the filling area in the container tube 500.

A feed outlet 58 for ejecting a content outside the feed container 5 is provided at the upper end of the head part 52.

The feed part 53 includes the operating tube 54, a movable shaft 55, and a rotation restricting part 56. The operating tube 54 is provided at the lower end of the body tube 51 in such a manner as to be rotatable relative to the body tube 51. The movable shaft 55 is housed in such a manner as to be inserted through the body tube 51 and the operating tube 54. The upper end of the movable shaft 55 is connected to the feed piston 57.

The rotation restricting part 56 has a ring shape, and is fitted into the body tube 51 at a step part S where the diameter of the body tube 51 changes.

An undepicted helical groove is formed in the periphery of the movable shaft 55, and an undepicted engaging protrusion is formed in the inner circumferential portion of the ring of the rotation restricting part 56. The movable shaft 55 rotates to vertically move relative to the rotation restricting part 56.

Specifically, when the operating tube 54 is rotated relative to the body tube 51, the movable shaft 55 housed in the body tube 51 and the operating tube 54 rotates so that the position of the movable shaft 55 rises relative to the rotation restricting part 56. As a result, the feed piston 57 connected to the end of the movable shaft 55 rises to reduce the internal volume of the filling space of the head part 52 and the body tube 51, so that the content is pushed upward. As a result, the content is pushed out into a nozzle passage 64 inside the nozzle 63c via an inlet 65 above the feed outlet 58.

According to this configuration, the movable shaft 55 remains only on the lower side of the feed piston 57 without piercing through the feed piston 57. Accordingly, because the movable shaft 55 is absent on the upper side of the feed piston 57, the content on the upper side of the feed piston 57 can be extruded without adhering to the movable shaft 55.

Furthermore, according to this configuration, the amount of ejection pushed out from the feed outlet 58 corresponds to the rising distance of the feed piston 57, and the rising distance of the feed piston 57 corresponds to the amount of rotation of the operating tube 54. Therefore, by controlling the amount of rotation of the operating tube 54, the amount of ejection (the amount of feed supply) can be finely adjusted.

Thus, because the operating tubes 54 rotate together with the driven gears 41 through 44 as described above, by controlling the amount of rotation of the drive gear 21 that rotates the driven gears 41 through 44, the amounts of feed of the respective contents can be adjusted.

Furthermore, the beam part 16, which is a horizontal partition part, is formed near the upper end of the tube portion case 12 surrounding the feed containers 5a through 5d. Holes 17 through which the feed containers 5a through 5d are inserted are formed in the beam part 16.

Furthermore, a support tube 18 is provided in the center of the beam part 16 in such a manner as to vertically extend relative to the upper surface and the lower surface of the beam part 16.

Here, as illustrated in FIG. 5, a portion of the cylinder part 6 lower than inflow holes 62a through 62d is the cylindrically shaped thin tubular part 67 that is larger in diameter and thinner than the upper part 66. A portion of the support tube 18 standing on the upper side of the beam part 16 holds the thin tubular part 67, which is on the lower side in the cylinder part 6, from its inner circumference side.

A portion of the support tube 18 on the lower side of the beam part 16 vertically extends along the periphery of the central tube 33 (see FIG. 2). Therefore, the support tube 18 has the function of guiding the central tube 33 such that an upper portion of the central tube 33 can slide along the inner curved surface of the central tube 33 when the central tube 33 moves up and down.

Furthermore, a through hole is formed in the central tube of the cylinder part 6, and the through hole is used as a temporary reservoir space 61 (see FIG. 13A) depending on the position of the extrusion piston 37.

The laterally extending nozzles 63a through 63d enable the contents to move from the feed outlets 58 at the top of the feed containers 5a through 5d to the inflow holes 62a through 62e that are open in a side surface of the temporary reservoir space 61 of the cylinder part 6.

Furthermore, according to this embodiment, the through hole serving as the temporary reservoir space 61 is formed by being surrounded by a portion around the inflow holes 62a through 62d, the upper part 66, and the top of an inner cylinder 7 installed as a separate body within the cylinder part 6.

Furthermore, the support tube 18 integrated with the beam part 16 extends to below the inflow holes 62a through 62d. The inner cylinder 7 having a ring-shaped lower end portion is provided as a separate body within the support tube 18.

As illustrated in FIG. 2, the central tube of the cylinder part 6 has a substantially tubular shape and includes the outer tube portion. Therefore, as illustrated in FIG. 5, the outer side of the support tube 18 is surrounded by the thin tubular part 67 from the outer circumferential side.

According to this configuration, the extrusion piston 37 is moved from an extrusion position to a reception position (an extrusion standby position) to cause the inflow holes 62 of the nozzles 63 to communicate with the temporary reservoir space 61 (see FIG. 13A) to cause the contents to flow into the temporary reservoir space 61, and thereafter, the extrusion piston 37 is moved from the reception position to the extrusion position to push out the contents that have flown into the temporary reservoir space 61 upward.

The lower surface of a lower end 37L of the extrusion piston 37 contacts the upper surface of the lower end of the inner cylinder 7 at the reception position, thereby defining the position of the bottom end in the case of moving from the extrusion position to the reception position.

Furthermore, the annular protrusion 68 provided on the upper surface of the upper part 66 of the cylinder part 6 is standing on the upper surface in order to engage with the bottom surface of a top case 11 of the device case as described below.

Furthermore, as illustrated in FIG. 5, the drive gear 21 is engaged with the lower end of the central tube 33 in such a manner as to be rotatable relative to the central tube 33. A lower portion of the central tube 33 is vertically slidable along part of the exterior of the transmission shaft 22.

Furthermore, the inner piston 36, which is an end portion larger in diameter than the piston rod 35, is provided at the upper end of the piston rod 35 extending from the central tube 33.

The extrusion piston 37 is an outer piston. The extrusion piston 37 has a tubular shape with a hollow center, having the upper end 37U and the lower end 37L. The upper end 37U is a circular top (top wall) covering the entire upper surface. The lower end 37L is a ring-shaped bottom (bottom wall) with a hole through which the piston rod 35 can be inserted being formed in the center, protruding inward from the inner curved surface of the sidewall.

The inner piston 36 and the piston rod 35 are provided within the extrusion piston 37. The inner piston 36 is provided at the upper end of the piston rod 35 and is larger in diameter than the piston rod 35.

When the inner piston 36 is in contact with the upper end 37U or the lower end 37L of the extrusion piston 37, the extrusion piston 37 moves together.

Figure 8:
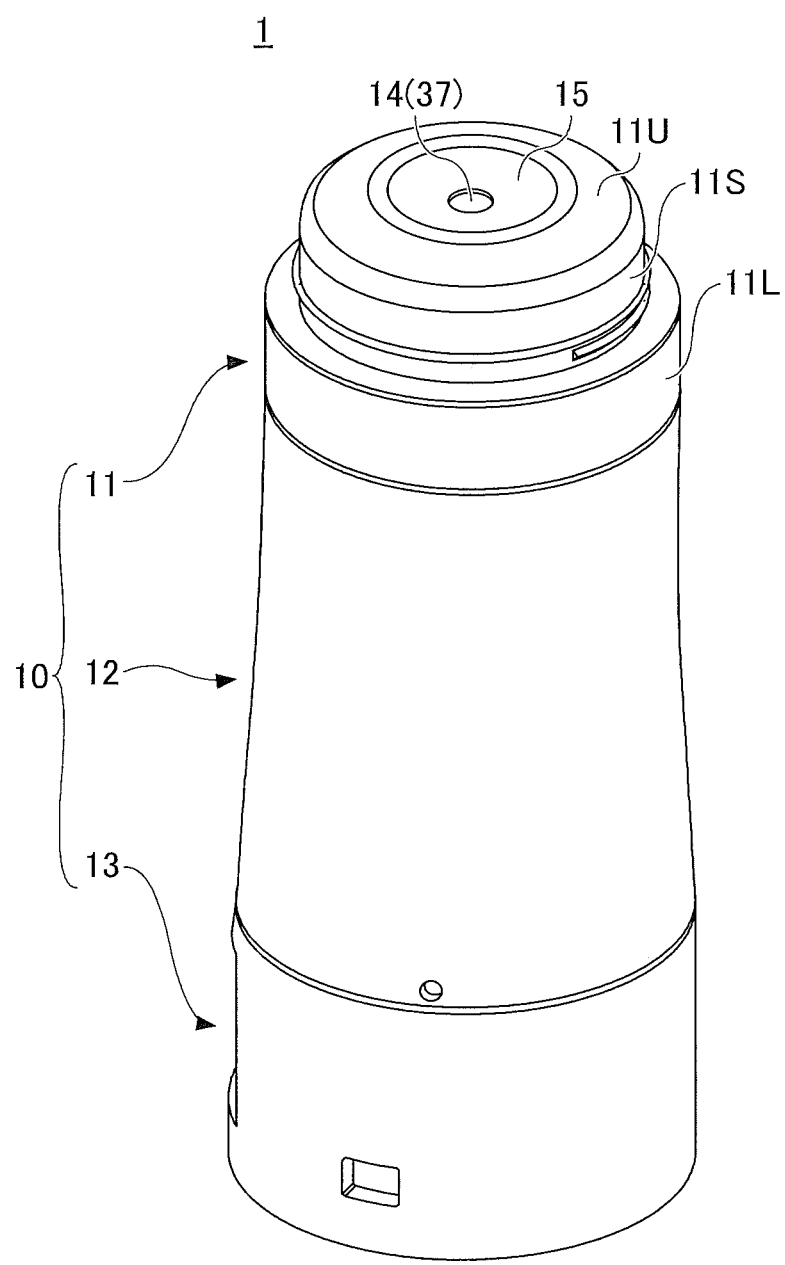
FIG. 8 is an overall view of a dispenser according to the first embodiment of the present invention.
Figure 10A:
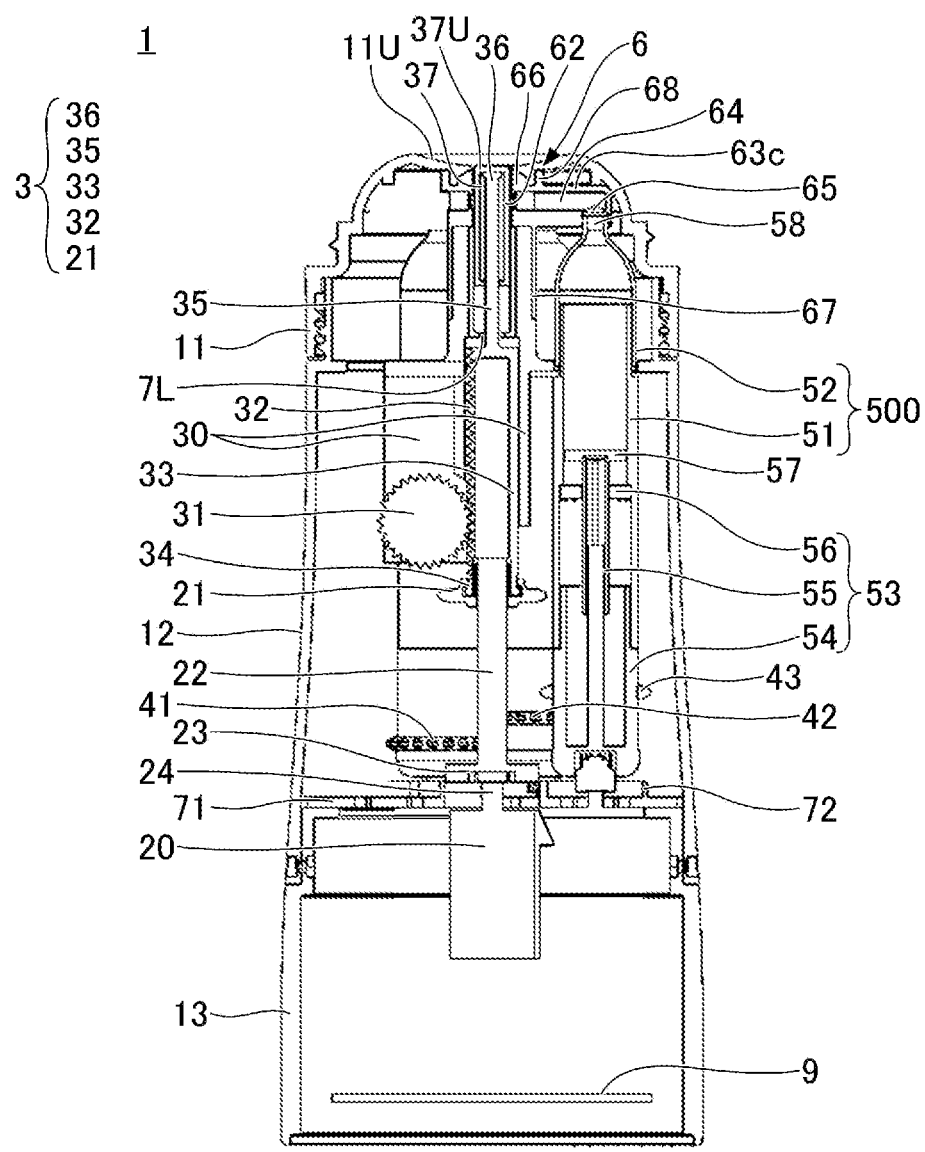
FIG. 10A is a perspective view of a feed drive mechanism except for container tube portions according to the second embodiment, where an inner piston is at a top end and an extrusion piston is at an extrusion position.

Furthermore, the support plate 71 is placed on an upper end portion of a bottom case 13 illustrated in FIG. 8 in a lower portion of the tube portion case 12 (see FIG. 10A). Tubular protrusions 72 surrounding the operating tubes 54 are provided on the upper surface of the support plate 71.

Furthermore, the pinion enclosure part 74 is attached to the beam part 16.

<Central Elevator>

Figure 6:
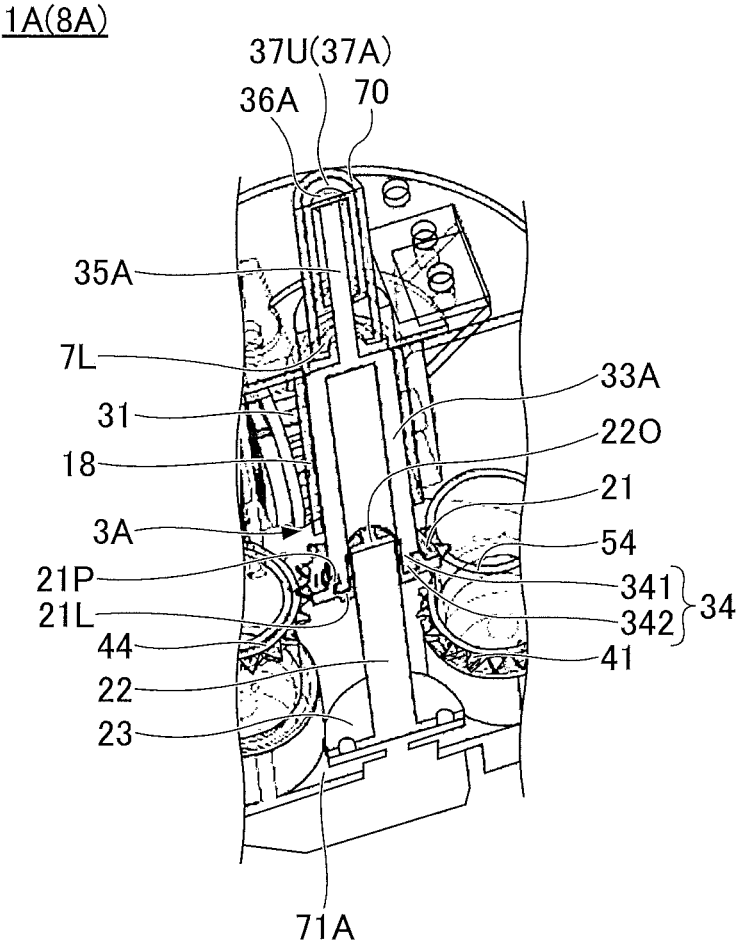
FIG. 6 is a sectional view of a central elevator and a transmission shaft according to a second embodiment.
Figure 7:
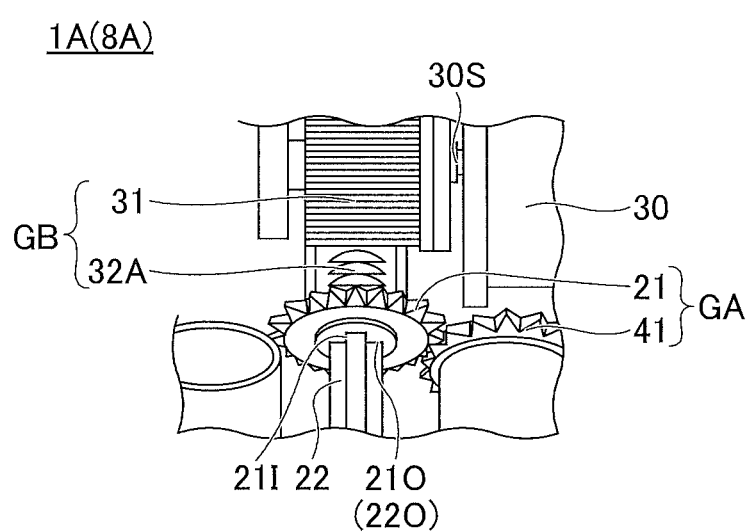
FIG. 7 is a lower-side perspective view illustrating the engagement of a drive gear and a central tube, the engagement of the drive gear and a driven gear, and the engagement of a pinion gear and a rack gear according to the second embodiment of the present invention.

FIG. 6 is a sectional view of a central elevator 3A and the transmission shaft 22 according to a second embodiment. FIG. 7 is an enlarged view illustrating the engagement of the drive gear 21 and the transmission shaft 22, the engagement of the drive gear 21 and the driven gear 41, and the engagement of the pinion gear 31 and the rack gear 32 according to the second embodiment.

A feed drive mechanism 8A according to the second embodiment illustrated in FIG. 6 is an example where an upper portion is different from that of the feed drive mechanism of FIG. 5 but the configuration of a central tube 33A and the transmission shaft 22 is substantially equal to the configuration of the first embodiment illustrated in FIG. 5.

As illustrated in FIG. 6, the vertically extending transmission shaft 22 has a cross-shaped section, and is vertically slidable relative to the inner circumferential portion of the drive gear 21 and engages with the inner circumferential portion of the drive gear 21 with respect to the direction of rotation. Therefore, the transmission shaft 22 can transmit a torque from the feed drive motor 20 to the drive gear 21.

The support disk 23 is provided at the lower end of the transmission shaft 22 to keep the transmission shaft 22 standing.

An engagement part 34 that engages with the drive gear 21 is provided at the lower end of the central tube 33A. This engagement part 34 includes a small diameter part 341 and a bottom end part 342 larger in diameter than the small diameter part.

The drive gear 21 bifurcates on the inner circumference side to sandwich the bottom end part 342 of the central tube 33A between a protruding part 21P and a lower surface 21L on the inner circumference side. This engagement restricts the drive gear 21 and the central tube 33A from vertically moving relative to each other, but does not restrict the drive gear 21 and the central tube 33A in the direction of rotation.

Therefore, when the drive gear 21 rotates together with the transmission shaft 22, the drive gear 21 slides and rotates along the outer circumference of the central tube 33A, and the drive gear 21 and the central tube 33A do not rotate together.

Furthermore, referring to FIG. 7, a cross-shaped hole 21O is formed in the center of the inner-circumference-side lower surface 21L of the drive gear 21. This cross-shaped hole 21O engages with the cross-shaped side external shape of the transmission shaft 22. Therefore, this engagement is fixed in the direction of rotation, so that the drive gear 21 rotates together with the rotation of the transmission shaft 22.

Furthermore, the engagement of this cross-shaped hole 21O of the drive gear 21 and the cross-shaped side external shape of the transmission shaft 22 does not restrict vertical movements. Therefore, the transmission shaft 22 does not vertically move even when the drive gear 21 moves up and down together with the central tube 33.

Furthermore, a rack gear 32A is provided in a side surface of the vertically extending central tube 33A. Therefore, the central tube 33A on which the rack gear 32A is provided moves up and down through the engagement of the rack gear 32A with the pinion gear 31.

In this case, the vertical position of the drive gear 21 is fixed relative to the central tube 33 because of the engagement part 34. Therefore, the drive gear 21 moves up and down together with the central tube 33A.

FIG. 6 illustrates a state where the central tube 33 is positioned at the top end. The central tube 33 is cylindrically hollow inside. Therefore, the central tube 33 can slide along the transmission shaft 22.

Furthermore, a piston rod 35A extends on the upper side of the central tube 33A, and an inner piston 36A larger in diameter than the piston rod 35A is provided at the upper end of the piston rod 35A. As illustrated in FIG. 6, the central tube 33A, the piston rod 35A, and the inner piston 36A are formed together as one piece and accordingly vertically move together when raised or lowered by the rack and pinion mechanism GB.

Furthermore, an extrusion piston 37A that is an outer piston is provided around the inner piston 36A. The extrusion piston 37A has a tubular shape. The upper end 37U has a planar shape. The lower end 37L has a ring shape, annularly standing and narrowing on the center side.

Therefore, When the inner piston 36A at the end of the piston rod 35A moves up and down within the extrusion piston 37A, the extrusion piston 37A does not move.

During the upward movement of the inner piston 36A with its upper end contacting the lower surface of the upper end 37U of the extrusion piston 37A, the extrusion piston 37A moves up together with the inner piston 36A.

Furthermore, during the downward movement of the inner piston 36A with its lower end contacting the upper surface of the lower end 37L of the extrusion piston 37A, the extrusion piston 37A moves down together with the inner piston 36A.

The central elevator 3 (3A) that moves up and down as a one-piece structure with the driving of the pinion gear 31 includes the inner piston 36 (36A) in addition to the above-described piston rod 35 (35A), central tube 33 (33A) provided with the rack gear 32 (32A), and the drive gear 21.

According to this example configuration, an inner cylinder 7A is provided around the extrusion piston 37. While a description of the cylinder part 6 is omitted with respect to FIGS. 6 and 7, it is assumed that the cylinder part 6 as illustrated in FIG. 2 is provided at the top.

Furthermore, as illustrated in FIG. 7, the pinion gear 31 is fit onto an output shaft 30S of the elevation drive motor 30. Therefore, the pinion gear 31 rotates as the output shaft 30S of the elevation drive motor 30 rotates.

Figure 10B:
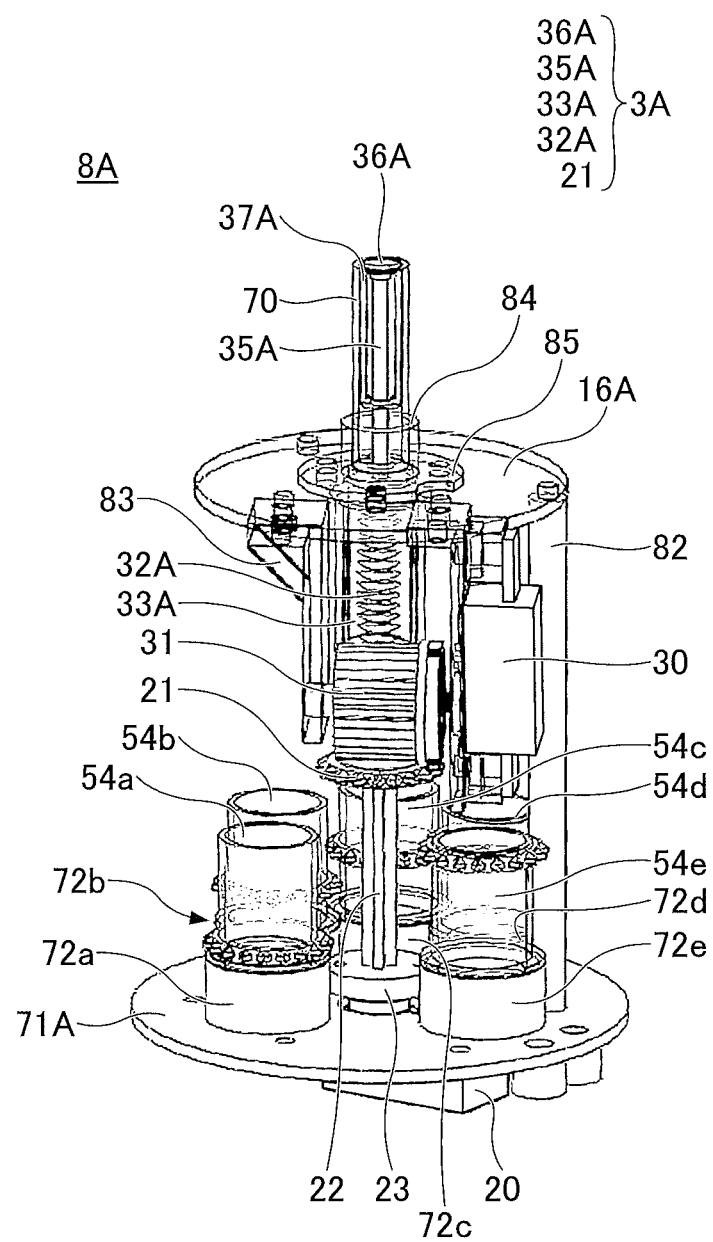
FIG. 10B is a perspective view of the feed drive mechanism except for container tube portions according to the second embodiment, where the inner piston is at the top end and the extrusion piston is at the extrusion position.

Furthermore, the driven gear 41 is engaged with the operating tube 54 of the feed container 5, being fixed in the direction of rotation and in the upward and the downward direction relative to the operating tube 54. Therefore, the driven gear 41 and the operating tube 54 are provided in such a manner as to always rotate together. As illustrated in FIG. 10B, according to the second embodiment, the five feed containers 5a through 5e are provided and the driven gears 41 through 45 are provided.

Furthermore, a dedicated drive source is not connected to the driven gear 41, and the driven gear 41 is closely fixed to the feed container 5 including the operating tube 54. Therefore, the driven gears 41 through 45 stop rotating while the driven gears 41 through 45 are not meshed with the drive gear 21 to be prevented from rotating.

As illustrated in FIGS. 6 and 7, the teeth of the drive gear 21 and the teeth of the driven gears 41 through 45 extend substantially horizontally, and when the drive gear 21 moves up and down together with the central tube 33A, the teeth of the drive gear 21 can pass through the teeth of the driven gears 41 through 45. Therefore, in controlling the drive gear 21, it is preferable that after stopping the driven gear, the drive gear 21 be rotated relative to the driven gears in order and, when stopped, be stopped at a position where the drive gear 21 does not contact the driven gear while moving up or down, so that the drive gear 21 is prevented from contacting the driven gear when moving up or down.

<Dispenser>

FIG. 8 is an exterior view of a dispenser according to the first embodiment, which includes the feed drive mechanism of FIGS. 2 through 7. The feed drive mechanism 8A illustrated in FIGS. 6 and 7 may be provided in the dispenser of FIG. 8, and a dispenser including the feed drive mechanism 8A is defined as a dispenser 1A according to the second embodiment.

As illustrated in FIG. 8, a dispenser 1 according to this embodiment is enclosed by the device case 10 that is an outer container. Within this device case 10, the feed drive mechanism 8 (8A) including the feed containers 5a through 5d (5e), the central elevator 3, and the extrusion piston 37 as illustrated in FIG. 2 is provided. According to the example illustrated in FIG. 8, the device case 10 is composed of the top case (upper case) 11, the tube portion case 12, and the bottom case 13. The device case 10, which is illustrated by way of example as having a substantially cylindrical shape according to this example, may also have a polygonal tube shape.

The top case 11 has an upper surface 11U in which an opening 14 is famed, serving as a dispensing surface. Furthermore, the side surface of the top case 11 has a stepped shape formed by combining cylinders that are different in diameter. A screw groove is formed in the outer circumferential portion of a side surface part 11S having a small diameter so that the side surface part 11S can be screwed to the inner curved surface of a cap. A side surface part 11L having a large diameter is larger in diameter than the side surface part 11S by the thickness of the cap.

Furthermore, in the upper surface 11U that is a dispensing surface, an area around the opening 14 is sloped inward to form a mortar-shaped (saucer-shaped) depression 15.

Furthermore, according to this embodiment, the opening 14 is provided in such a manner as to allow the extrusion piston 37 as illustrated in FIG. 4 to be inserted through the opening 14. Therefore, FIG. 8 illustrates an example where the perimeter of the extrusion piston 37 fit into the through hole of the central tube of the cylinder part 6 which communicates with the opening 14 and the diameter of the opening 14 are equal in size.

According to the dispenser 1, the feed containers 5a through 5d (5e) are removable, replaceable cartridges.

<Customizing Dispensing System>

Figure 9:
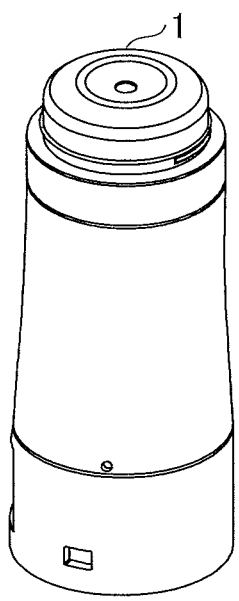
FIG. 9 is an overall view of a customizing dispensing system including a feeder according to the first embodiment of the present invention.
Figure 9:
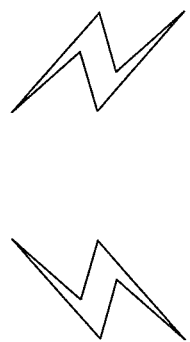
Figure 9:
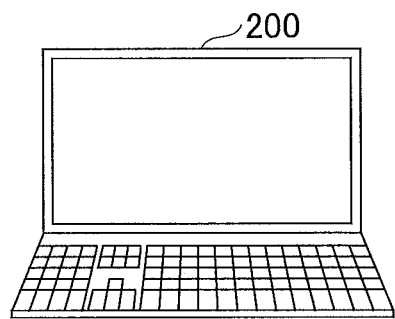
Figure 9:
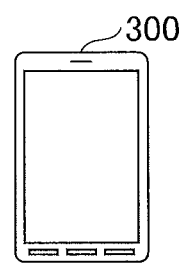

FIG. 9 is a schematic diagram of a customizing dispensing system including the dispenser 1 of the present invention.

According to a customizing dispensing system 1000 including the dispenser 1 of the present invention, it is possible to receive instruction information on the composition of the contents from an information processing terminal that is an external apparatus that can communicate with the dispenser 1 via a network.

According to this embodiment, the dispenser 1 and information processing terminals 200 and 300 are referred to in combination as the customizing dispensing system 1000. The customizing dispensing system 1000 is composed of the dispenser 1 and at least one of the computer 200 and the smartphone 300.

According to this embodiment, a communication part 91 (see FIG. 16) is provided in part of the control board of the dispenser, and the communication part 91 can communicate with the computer (information processing apparatus) 200 or the smartphone 300 that is an information processing terminal.

The information processing terminals 200 and 300, for example, download an application in advance to have an instruction receiving function to receive instruction information on the composition of the contents of the dispenser 1. Accordingly, a user inputs information on the amount of dispensing (composition) of the dispenser to the information processing terminal 200 or 300.

FIG. 9 illustrates an example where no operation part is provided in the dispenser 1 with which communications can be performed. An operation part, however, may also be further provided in the dispenser with which communications can be performed, so that the dispenser can be further operated at hand in addition to by instructions from the information processing terminals 200 and 300.

(Description of Operations)

Next, the rising and lowering operations of the central elevator 3 and the extrusion piston 37 are described with reference to FIGS. 10A through 15B.

FIG. 10A is a side sectional view of the dispenser 1 according to the first embodiment and FIG. 10B is a perspective view of the feed drive mechanism 8A except for container tube portions according to the second embodiment in a state (a) where the inner piston 36 (36A) is at the top end and the extrusion piston 37 (37A) is at the extrusion position.

Furthermore, according to the above-described first embodiment, an example where the four feed containers 5a through 5d are provided in the dispenser 1 is described, while according to the second embodiment illustrated in FIG. 10B, the five feed containers 5a through 5e are provided in the dispenser 1. In the case of using a dispensing container for dispensing a point cosmetic, cosmetics contained in the feed containers 5a through 5e are, for example, cosmetics of cyan, magenta, yellow and white as described above, and additionally, black. In FIG. 10B, a graphical representation of part of the feed containers 5a through 5e except for the operating tubes 54a through 54e and the cylinder part 6 is omitted.

When the dispenser 1 (1A) is turned off or when the dispenser 1 (1A) is after extrusion of contents or in a standby state while being turned on, the extrusion piston 37 is at the extrusion position illustrated in FIGS. 10A and 10B. According to the first and the second embodiment, the extrusion position is a top position where the upper end 37U of the extrusion piston 37 is at substantially the same position as the upper surface 11U (see FIG. 8) in which the opening 14 that is a dispensing hole is provided.

Figure 11:
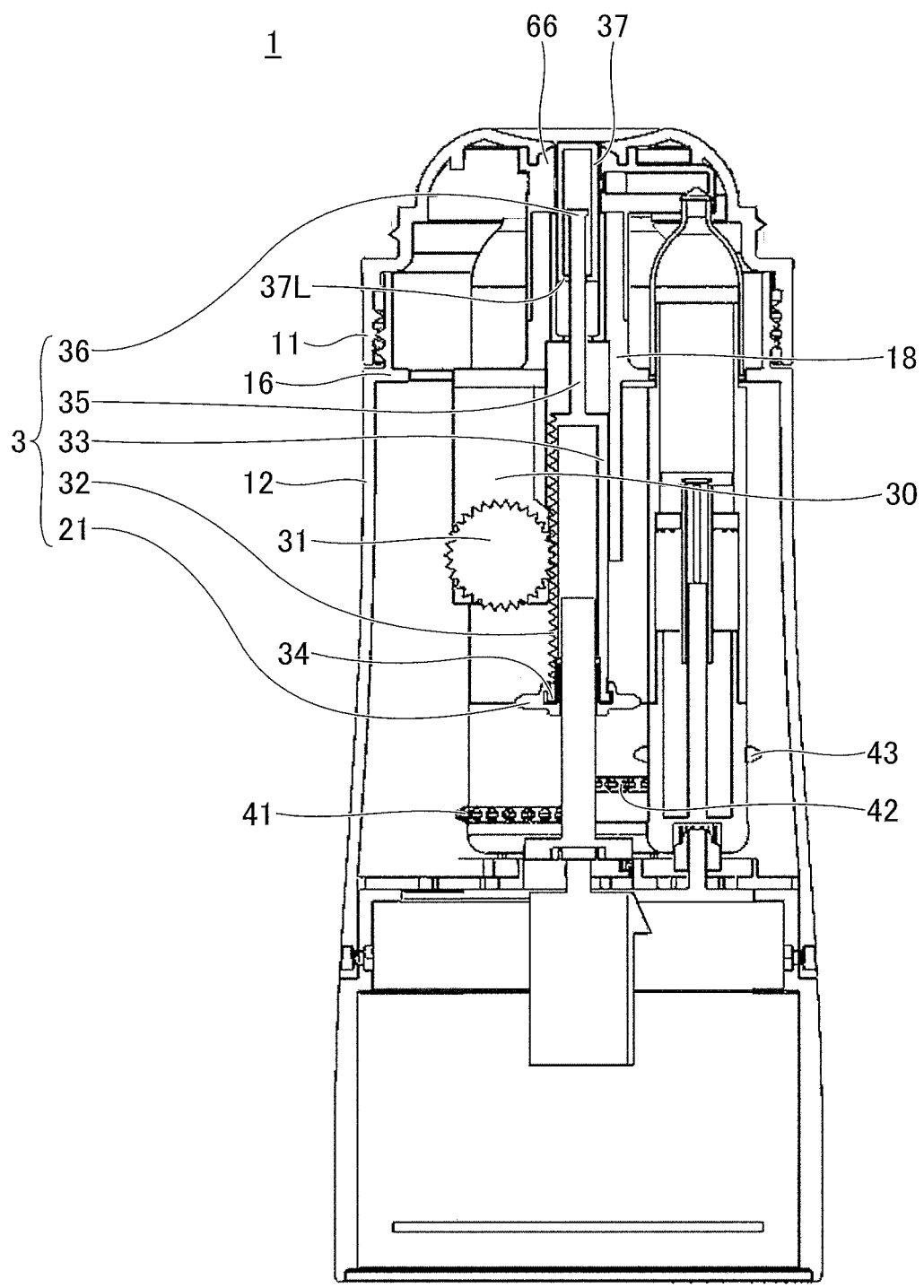
FIG. 11 is a side sectional view of the dispenser according to the first embodiment, where an extrusion piston is at the extrusion position while an inner piston is descending from the top end.

FIG. 11 is a side sectional view of the dispenser 1 according to the first embodiment in a state (b) where the extrusion piston 37 is at the extrusion position while the inner piston 36 is descending from the top end.

In order to move the extrusion piston 37 from the extrusion position during standby illustrated in FIG. 10A to the reception position, first, the pinion gear 31 is reversed by the elevation drive motor 30 to lower the central elevator 3 (3A) including the rack gear 32 meshing with the pinion gear 31. Immediately after starting to lower the central elevator 3 from the state of FIG. 10A, the inner piston 36 lowers within the hollow of the extrusion piston 37 and the position of the extrusion piston therefore remains unchanged.

Therefore, as illustrated in FIG. 11, only the central elevator 3 including the inner piston 36 lowers while the extrusion piston 37 remains unmoved.

Figure 12:
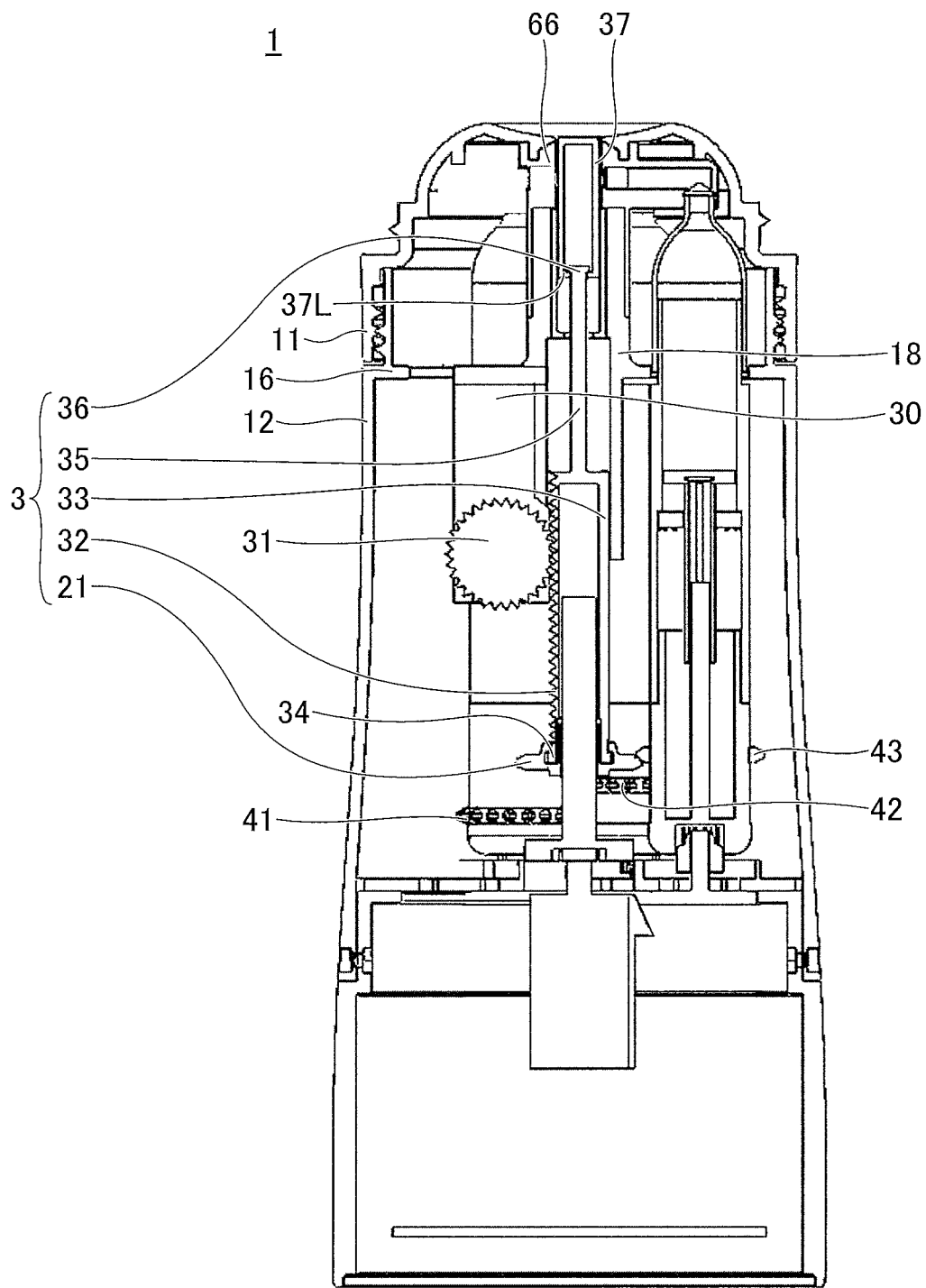
FIG. 12 is a side sectional view of the dispenser according to the first embodiment, where the inner piston starts to contact a lower end of the extrusion piston and the extrusion piston is at the extrusion position.

FIG. 12 is a side sectional view of the dispenser 1 according to the first embodiment in a state (c) where the inner piston 36 starts to contact the lower end 37L of the extrusion piston 37 and the extrusion piston 37 is at the extrusion position.

When the pinion gear 31 continues to be further reversed by the elevation drive motor 30, the inner piston 36 slides down the hollow of the extrusion piston 37 from the position illustrated in FIG. 11, so that the inner piston 36 contacts the upper surface of the lower end 37L of the extrusion piston 37 as illustrated in FIG. 12.

When the inner piston 36 further lowers from the state of FIG. 12, the inner piston 36 is followed by the extrusion piston 37, so that the extrusion piston 37 lowers together.

Figure 13A:
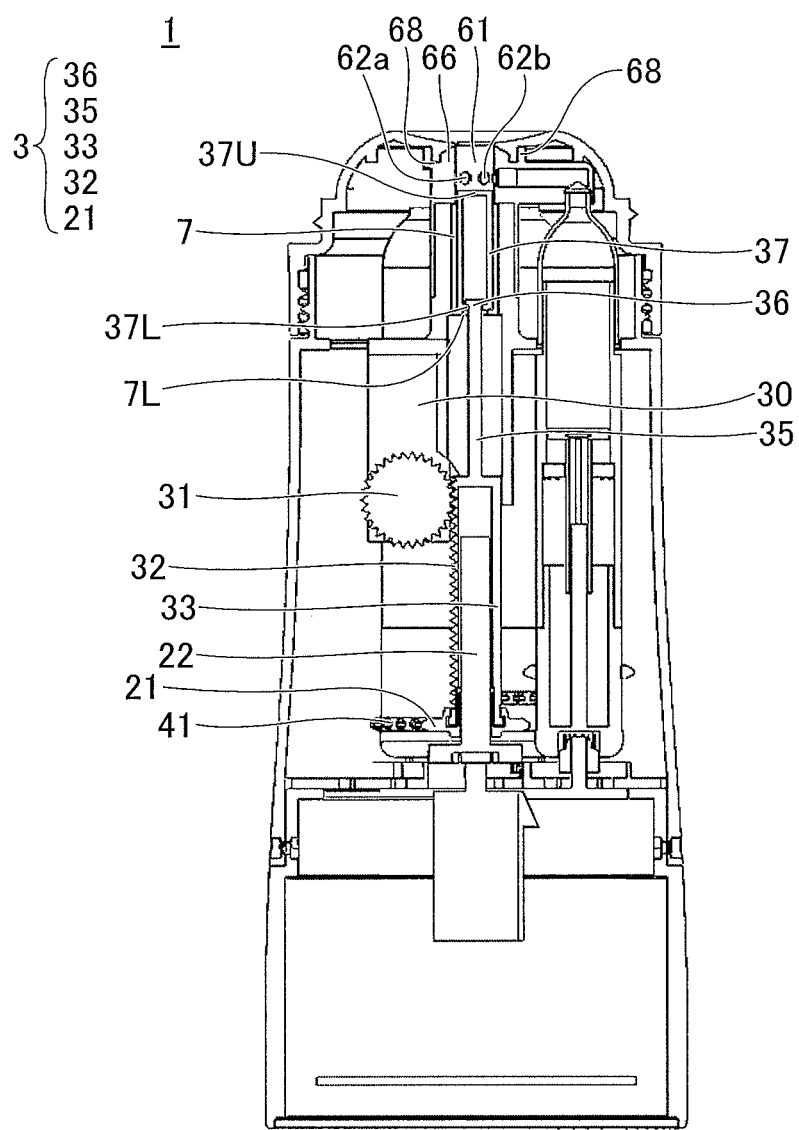
FIG. 13A is a side sectional view of the dispenser according to the first embodiment, where the inner piston has lowered to a bottom end and the extrusion piston has reached a reception position.
Figure 13B:
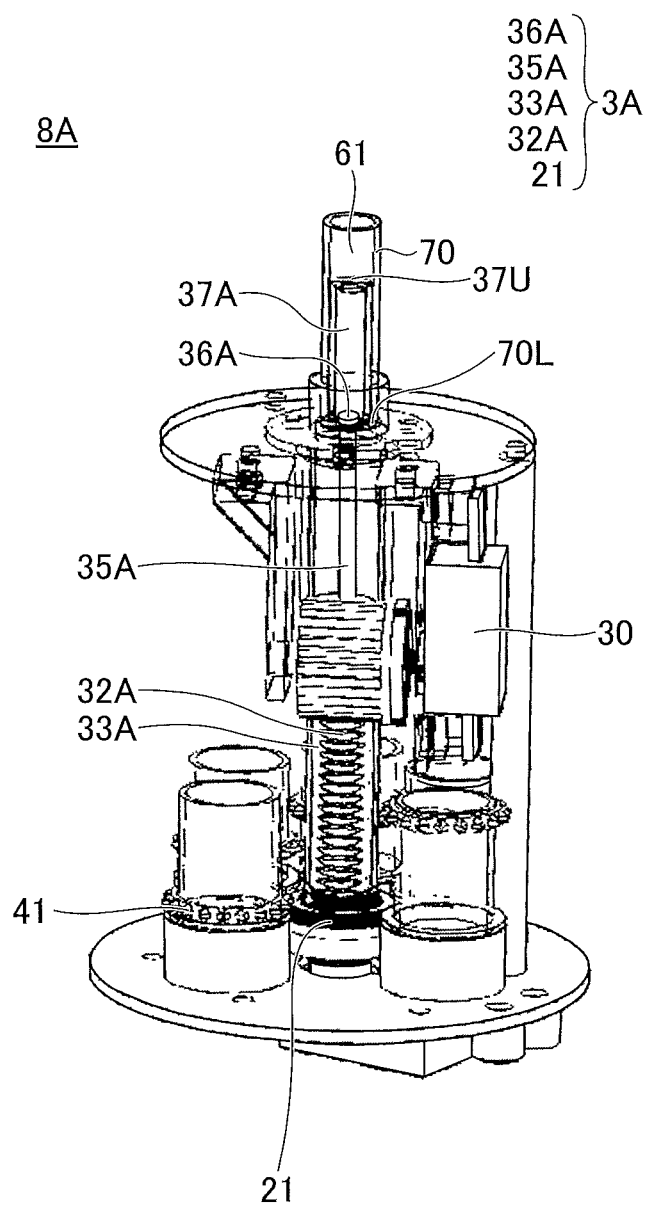
FIG. 13B is a perspective view of the feed drive mechanism except for container tube portions according to the second embodiment, where the inner piston has lowered to the bottom end and the extrusion piston has reached the reception position.

FIG. 13A is a side sectional view of the dispenser 1 according to the first embodiment and FIG. 13B is a perspective view of the second embodiment except for container tube portions in a state (d) where the inner piston 36 has lowered to the bottom end and the extrusion piston 37 has reached the reception position.

When the pinion gear 31 continues to be further reversed by the elevation drive motor 30 to cause the inner piston 36 (36A) to further lower from the state of FIG. 12, the extrusion piston 37 (37A) lowers together to reach the reception position, which is a bottom position, when the inner piston 36 (36A) reaches the bottom end as illustrated in FIGS. 13A and 13B.

The extrusion piston 37 (37A) lowers together as the inner piston 36 (36A) of the central elevator lowers in FIG. 12 to FIG. 13A. As a result, the inflow holes 62a through 62d (62a through 62e) in the side surface of the temporary reservoir space (ejection space) 61 of the cylinder part 6 closed by the extrusion piston 37 (37A) are opened. According to the first and the second embodiment, the reception position is the bottom position where the upper end 37U of the extrusion piston 37 opens the inflow holes 62a through 62d (62a through 62e) in the side surface of the temporary reservoir space 61.

At this point, according to the configuration of the first embodiment illustrated in FIG. 13A, the lower surface of the lower end 37L of the extrusion piston 37 contacts a stopper 7L, which is the ring-shaped lower end of the inner cylinder 7, to define the lower end position. The position of the lower end of the extrusion piston 37 may alternatively be defined by electronic control.

According to the first embodiment illustrated in FIG. 13A, at the bottom end position of the central elevator 3 including the inner piston 36, the drive gear 21 provided in a lower portion of the central elevator 3 engages with the driven gear 41, which is at the lowest position.

In contrast, according to the second embodiment illustrated I FIG. 13B, at the bottom end position of the central elevator 3A including the inner piston 36A, the lower surface of the lower end 37L of the extrusion piston 37A contacts a stopper 70L, which is the ring-shaped lower end of an inner cylinder 70, to define the lower end position, and the drive gear 21 provided in a lower portion of the central elevator 3 reaches a position lower than the driven gear 41 at the lowest position.

The elevation control of either FIG. 13A or FIG. 13B may be applied, depending on the length of the central elevator, the lengths of the cylinder part 6 and the inner cylinder 7, the number of feed containers, etc.

Figure 14A:
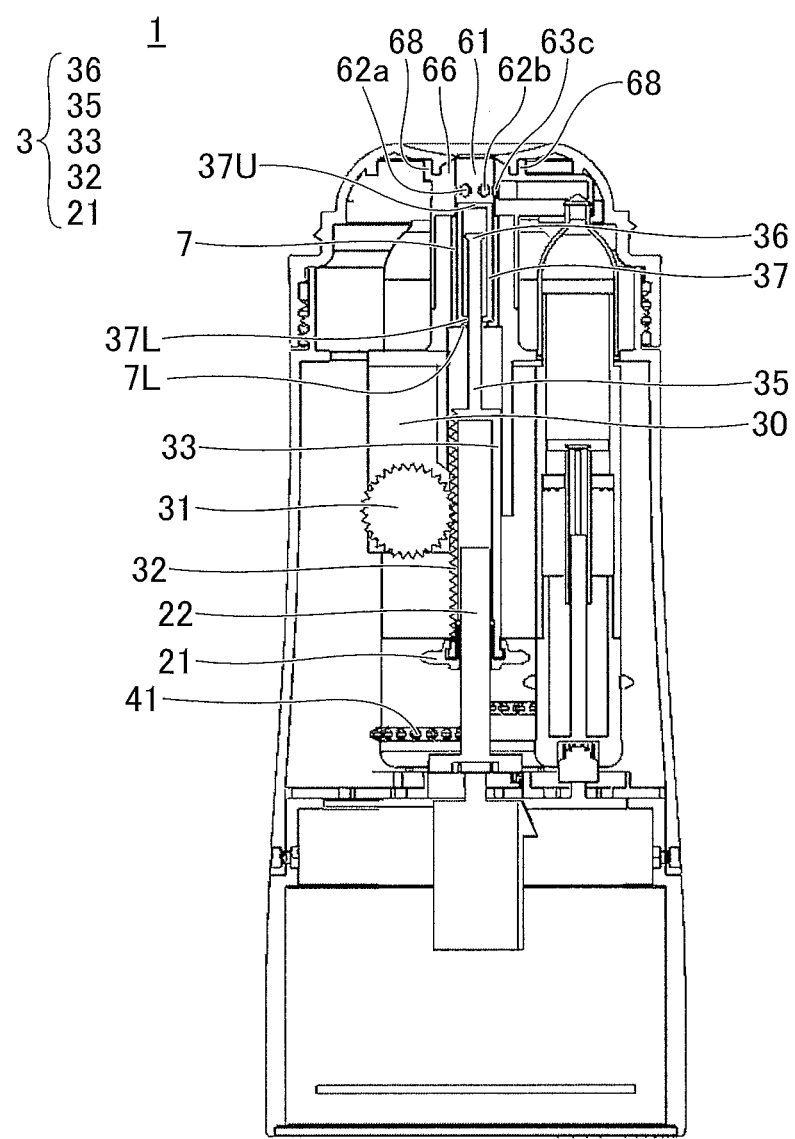
FIG. 14A is a side sectional view of the dispenser according to the first embodiment, where the inner piston 36 moves up from the bottom end and the extrusion piston is at the reception position.
Figure 14B:
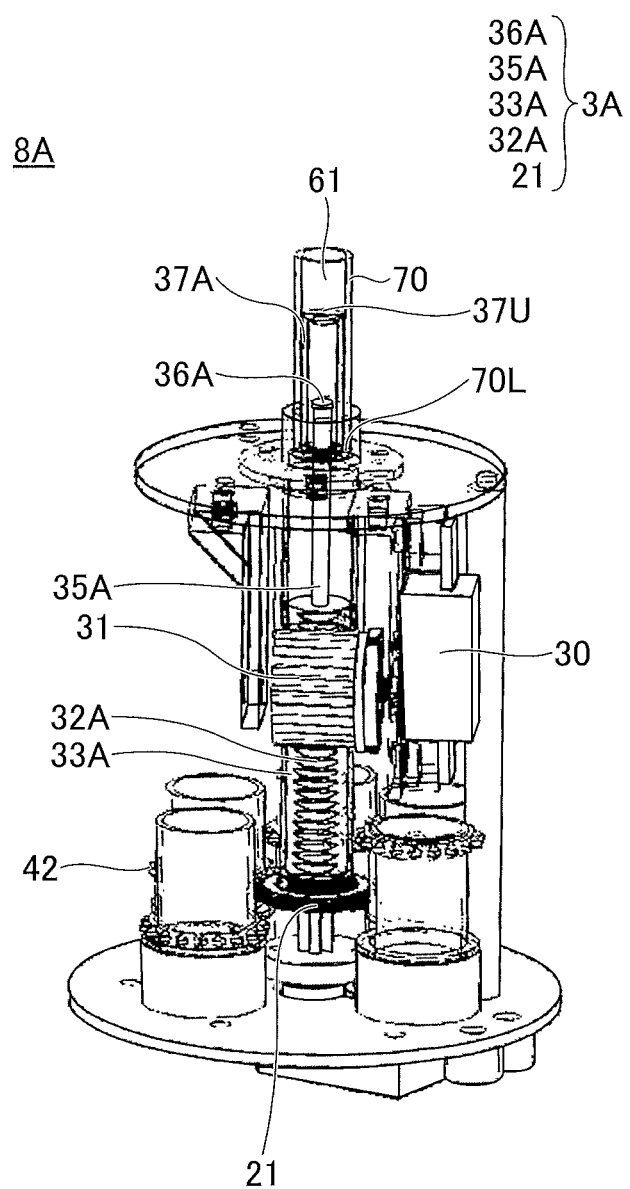
FIG. 14B is a perspective view of the feed drive mechanism except for container tube portions according to the second embodiment, where the inner piston moves up from the bottom end and the extrusion piston is at the reception position.

FIG. 14A is a side sectional view of the dispenser 1 according to the first embodiment and FIG. 14B is a perspective view of the feed drive mechanism 8A except for container tube portions according to the second embodiment in a state (e) where the inner piston 36 (36A) moves up from the bottom end and the extrusion piston 37 is at the reception position.

When the inner piston 36 starts to rise from the state of FIGS. 13A and 13B, the inner piston 36 slides up within the hollow of the extrusion piston 37 as illustrated in FIGS. 14A and 14B. Therefore, the position of the extrusion piston 37 remains unchanged at the reception position.

The elevation of the central elevator 3 of FIG. 13A to FIG. 14A (FIG. 13B to FIG. 14B) is performed in order to adjust the height of the drive gear 21 provided in a lower portion of the central elevator 3 to cause the drive gear 21 to mesh with one of the surrounding driven gears 41, 42, 43 and 44.

The second embodiment illustrated in FIG. 14B shows a state where the drive gear 21 meshes with the second driven gear 42 from the bottom.

The first embodiment illustrated in FIG. 14A shows a state where the drive gear 21 meshes with the topmost driven gear 44. FIG. 14A, however, is a sectional view, and the driven gear 44 is not depicted.

The drive gear 21 connected to the feed drive motor 20 rotates as much as the set amount of rotation while meshing with one of the driven gears 41, 42, 43 and 44 (45). As a result, the operating tube 54 of one of the feed containers 5a through 5d (5e) with which the drive gear 21 is meshed rotates to push out a content from the feed outlet 58 of the one of the feed containers 5a through 5d (5e) and cause the content to flow into the temporary reservoir space 61 via a corresponding one of the nozzles 63a through 63d (63e) and a corresponding one of the inflow holes 62a through 62d (62e).

In the case of feeding multiple contents in the dispenser, the operation of feeding a content by raising the drive gear 21 within the range of sliding of the inner piston 36 within the hollow of the extrusion piston 37 and rotating the drive gear 21 with the drive gear 21 meshing with one of the driven gear 41 through 44 (45) is repeatedly performed multiple times with the extrusion piston 37 remaining at the reception position.

Here, the amount of feeding (the amount of dispensing) can be adjusted by controlling the amount of rotation of the feed drive motor 20 that drives the drive gear 21 according to the amount set in the information processing terminal 200 (300) or the dispenser 1.

Figure 15A:
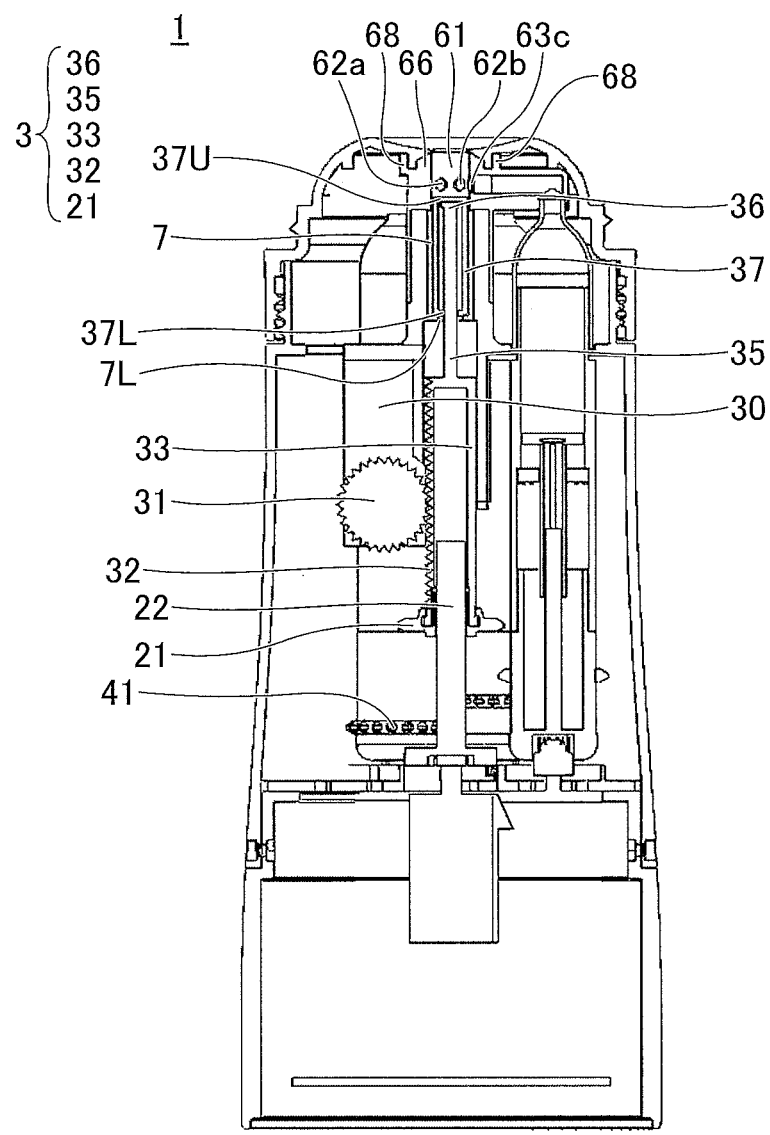
FIG. 15A is a side sectional view of the dispenser according to the first embodiment, where the inner piston starts to contact an upper end of the extrusion piston and the extrusion piston is at the reception position.
Figure 15B:
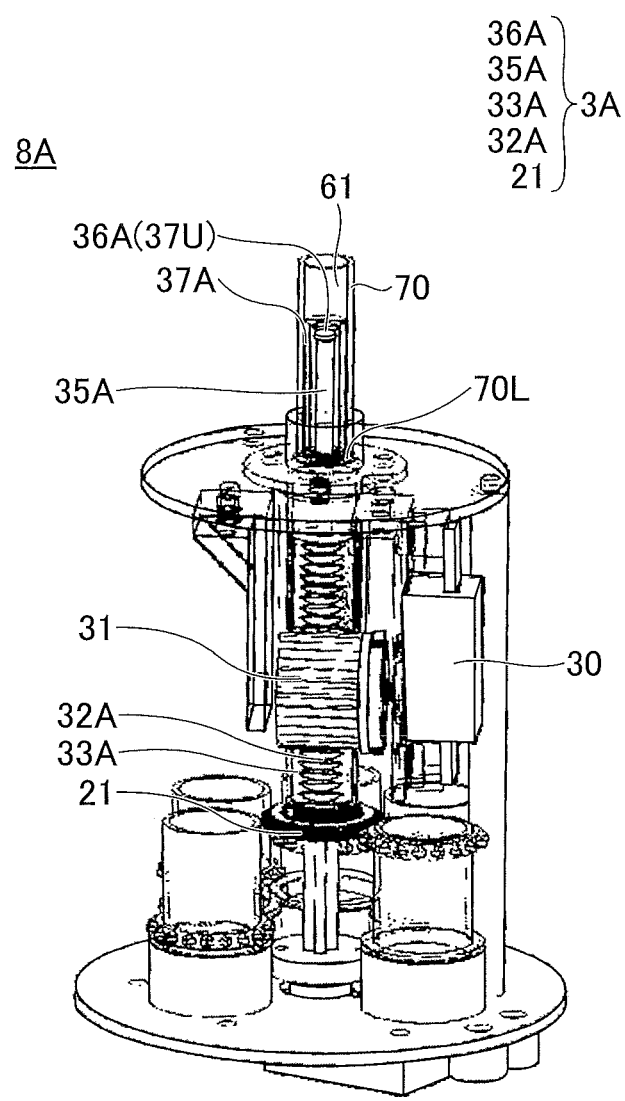
FIG. 15B is a perspective view of the feed drive mechanism except for container tube portions according to the second embodiment, where the inner piston starts to contact the upper end of the extrusion piston and the extrusion piston is at the reception position.

FIG. 15A is a side sectional view of the dispenser 1 according to the first embodiment and FIG. 15B is a perspective view of the feed drive mechanism 8A except for container tube portions according to the second embodiment in a state (f) where the inner piston 36 starts to contact the upper end of the extrusion piston 37 and the extrusion piston is at the reception position.

The central elevator rises to a position illustrated in FIGS. 15A and 15B when the flowing of a set one or more of the contents from one or more of the inflow holes 62a through 62d (62e) into the temporary reservoir space 61 is completed by the rise of the central elevator and the rotation of the drive gear 21 at the position of FIGS. 14A and 14B.

By causing the elevation drive motor 30 to rotate the pinion gear 31 forward from the position as illustrated in FIG. 14A, where the drive gear 21 meshes with the topmost driven gear 44 (45), the inner piston 36 of the central elevator slides up within the hollow of the extrusion piston 37 to contact the upper surface of the upper end 37U of the extrusion piston 37 as illustrated in FIG. 15A.

As the inner piston 36 (36A) further rises from the state of FIGS. 15A and 15B, the inner piston 36 is followed by the extrusion piston 37, so that the extrusion piston 37 (37A) rises together.

The central elevator 3 and the extrusion piston 37 (37A) are further pushed up from the state of FIGS. 15A and 15B into the state illustrated in FIGS. 10A and 10B. Specifically, as the inner piston 36 (36A) rises with the upper surface of the inner piston 36 (36A) contacting the lower surface of the upper end 37U of the extrusion piston 37 (37A), the extrusion piston 37 (37A) rises together. As a result, the extrusion piston 37 (37A) moves from the reception position to the extrusion position to push out the contents upward.

Thus, the extrusion piston 37 (37A) can be vertically moved by the elevation drive motor 30 that vertically moves the drive gear 21. Therefore, it is unnecessary to separately provide a drive source for the extrusion piston 37. Accordingly, it is possible to reduce the number of motors in the dispenser 1 (1A) by sharing a motor.

Furthermore, because the inner piston 36 that moves together with the vertical movement of the rack gear 32 can move in a hollow within the extrusion piston 37, the extrusion piston 37 is prevented from vertically moving where the drive gear 21 selectively meshes with one of the driven gears 41 through 44. Therefore, there is no need to uselessly move the extrusion piston 37 while selecting one of the driven gears 41 through 44. Therefore, it is possible to reduce the wear of the outer circumferential portion of the extrusion piston 37 that is an outer piston that contacts the contents.

The above example is described using a rack and pinion mechanism as a mechanism for changing the height of the drive gear in order to cause the drive gear to selectively mesh with one of multiple gears (driven gears) and rotate. The mechanism for changing the height of the drive gear, however, may be another mechanism. For example, the mechanism for changing the height of the drive gear may be constituted of a screw-type feed mechanism (pall screw mechanism) such as the above-described feed part.

<Control Block>

Figure 16:
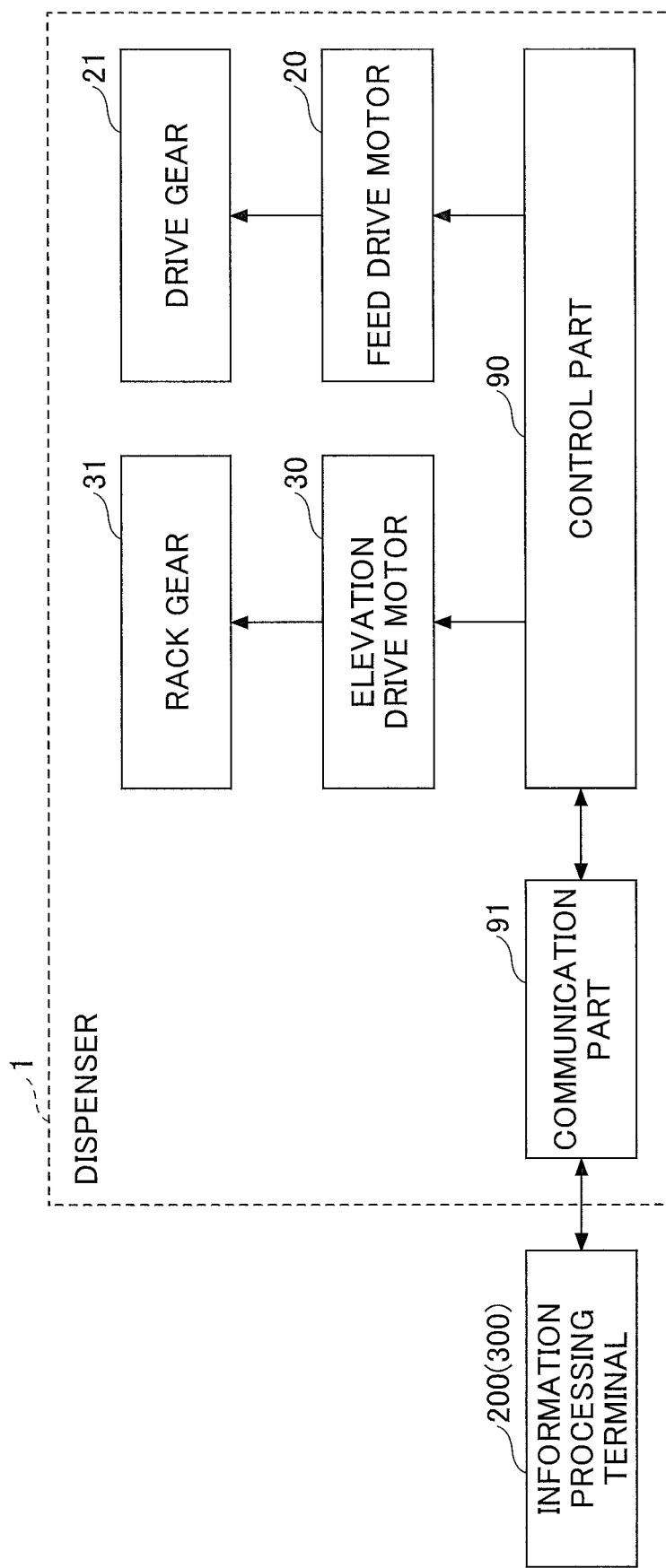
FIG. 16 is a control block diagram pertaining to feed control.

FIG. 16 is a control block diagram of the dispenser. According to an embodiment of the present invention, the control part 90 is connected to the communication part 91, the feed drive motor 20, and the elevation drive motor 30. The control part 90 and the communication part 91 are provided on the control board 9 illustrated in FIG. 2. This control part 90 is implemented by a CPU (Central Processing Unit), a ROM (Read Only Memory), a RAM (Random Access Memory), etc., that are not depicted.

The control part 90 sets the amount of supply of each of the contents to be caused to flow from the feed containers 5a through 5d (5e) into the temporary reservoir space 61 of the cylinder part 6 via the nozzles 63a through 63d (63e) on the upper side.

Specifically, the control part 90 determines the composition ratio of the contents based on instruction information on their composition, determines the amounts of supply of the contents, and converts the determined amounts of supply of the contents in parameters. For example, by controlling the time of rotation of the feed drive motor 20 as a parameter, the control part 90 controls the amounts of supply (the amounts of extrusion transfer) of the contents. The control part 90 determines the duration of supply of electric power to the feed drive motor 20 based on the determined parameters.

Immediately after receiving the instruction from the information processing terminal 200, in order to adjust the height of the inner piston 36 and the drive gear 21, the control part 90 supplies electric power to the elevation drive motor 30 to lower the central elevator 3 as illustrated in FIG. 10A to FIG. 11 to FIG. 12 so that the extrusion piston 37 arrives at the reception position.

Based on the amounts of supply of the contents determined by the information processing terminal 200 or the control part 90, the control part 90 performs control to repeatedly perform the operation of feeding a content by raising the drive gear 21 and rotating the drive gear 21 with the drive gear 21 meshing with one of the driven gears 41 through 44 (45).

At this point, if the drive gear 21 is moved up or down while meshing with one of the driven gears 41 through 44 (45) and rotating, the drive gear 21 may not appropriately mesh with the driven gears 41 through 44 (45). Therefore, the control part 90 selectively drives the feed drive motor 20 or the elevation drive motor 30 such that the driving of the feed drive motor 20 and the driving of the elevation drive motor 30 differ in timing.

Figure 17:
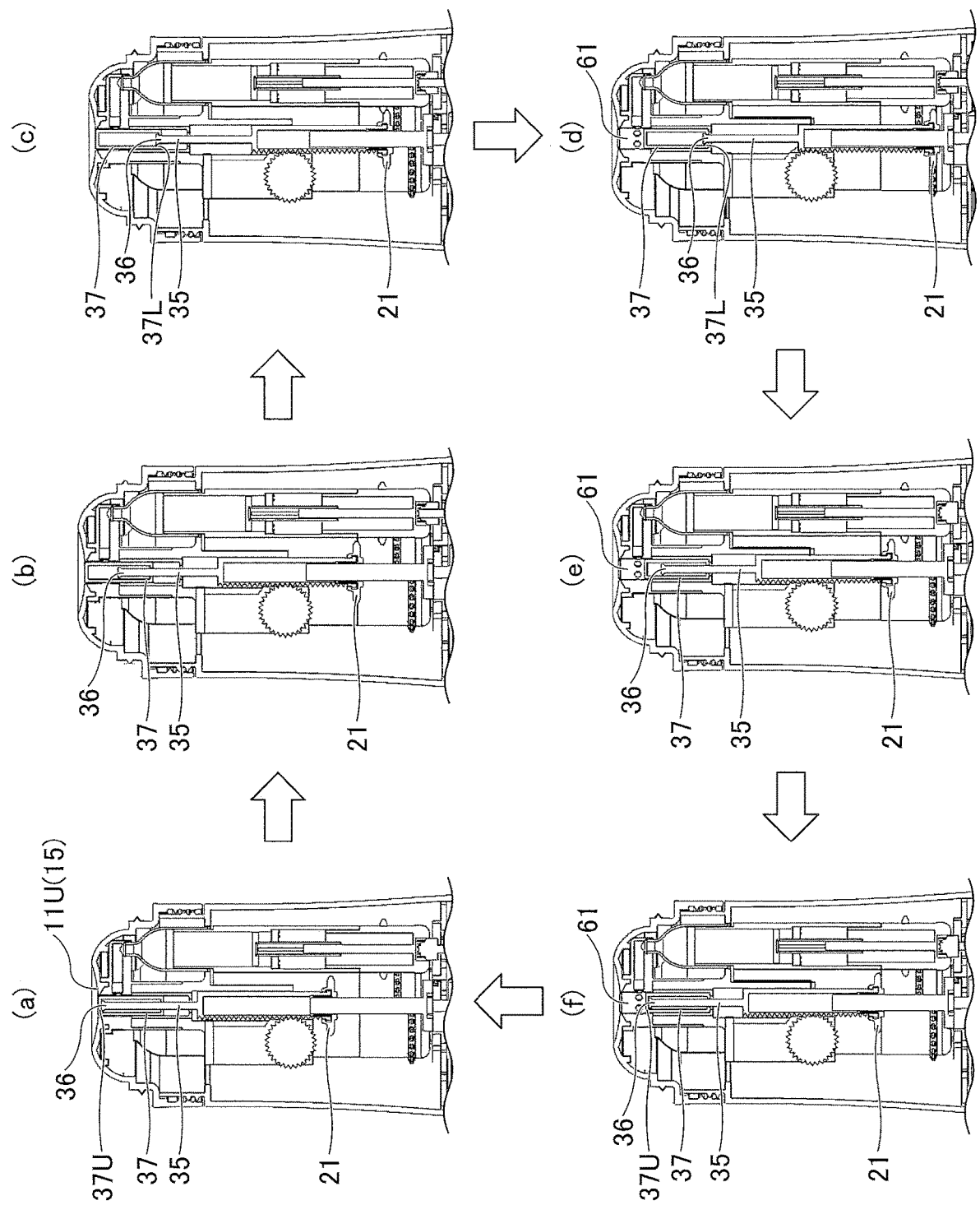
FIG. 17 illustrates sectional views illustrating an operation in the feed drive mechanism.

Here, when raising and lowering the central elevator 3 (3A), the elevation drive motor 30 drives the pinion gear 31 such that the pinion gear 31 rotates in opposite directions at the time of raising and at the time of lowering. As described below, FIG. 17 illustrates an example where the control part 90 controls the elevation drive motor 30 to rotate the pinion gear 31 forward at the time of raising and controls the elevation drive motor 30 to reverse the pinion gear 31 at the time of lowering. The forward and the reverse rotation, however, may be interchanged.

Furthermore, in addition to performing control to supply a predetermined amount of electric power to the above-described motors 20 and 30 with predetermined timing, the control part 90 also controls the timing of communication of the communication part 91, the reception of instructions from the communication part 91, the reception of instructions from below-described operating parts provided in the dispenser, the adjustment of lighting of lighting parts, etc.

FIG. 16 illustrates an example where the control part 90 controls the feed drive motor 20 and the elevation drive motor 30 together, while different control parts that can work together may be separately provided for the elevation drive motor 30 and the feed drive motor 20 as an elevation control part and a feed control part, respectively.

An example where the amounts of supply (the amounts of extrusion transfer) of the contents are controlled based on instruction information on their composition in the control part 90 of the dispenser 1. This supply amount computation, however, may also be executed in the network-connected information processing terminal 200 or 300.

<Operation Steps>

Figure 18:
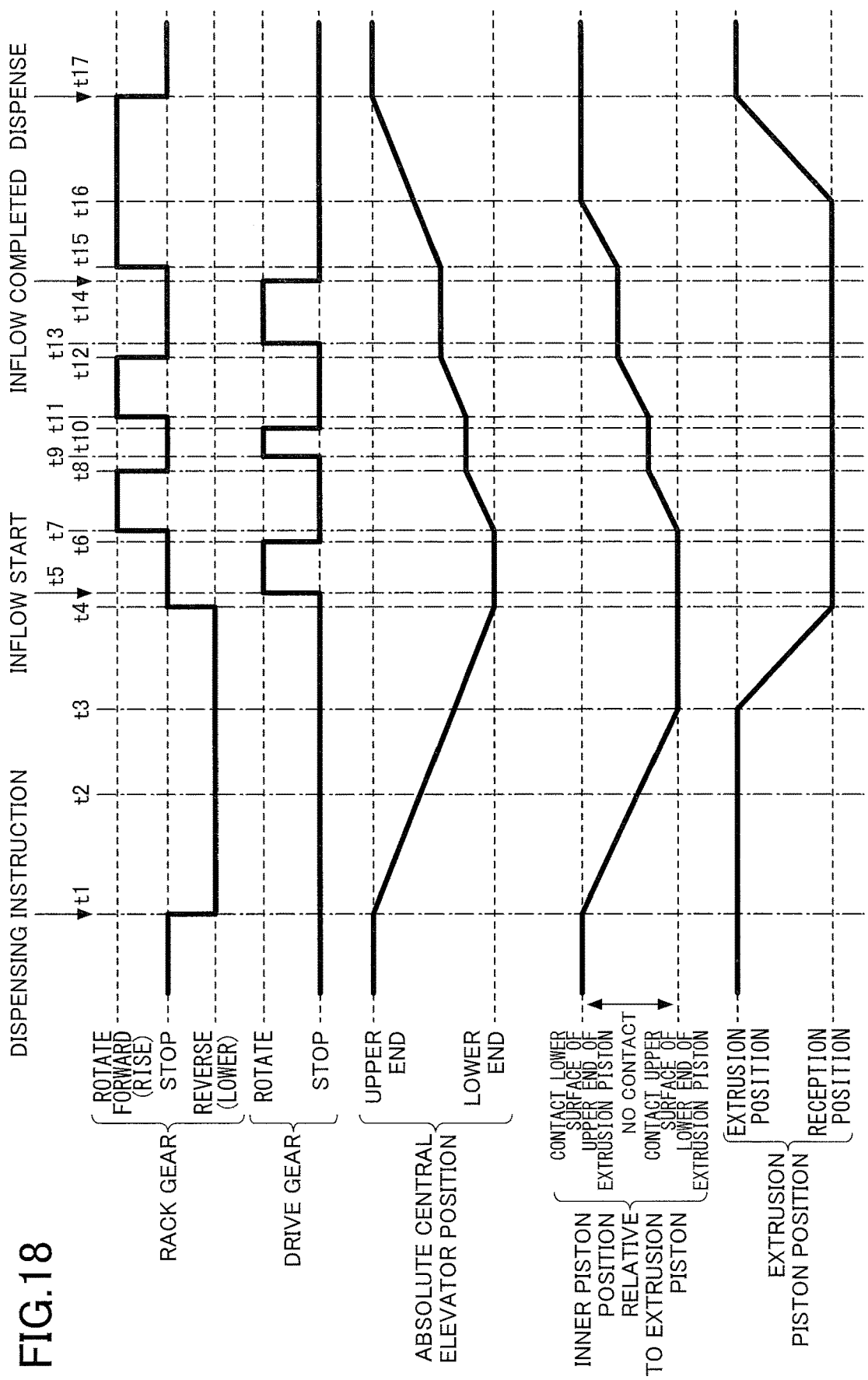
FIG. 18 is a timing chart pertaining to a dispensing operation according to the first embodiment.
Figure 19:
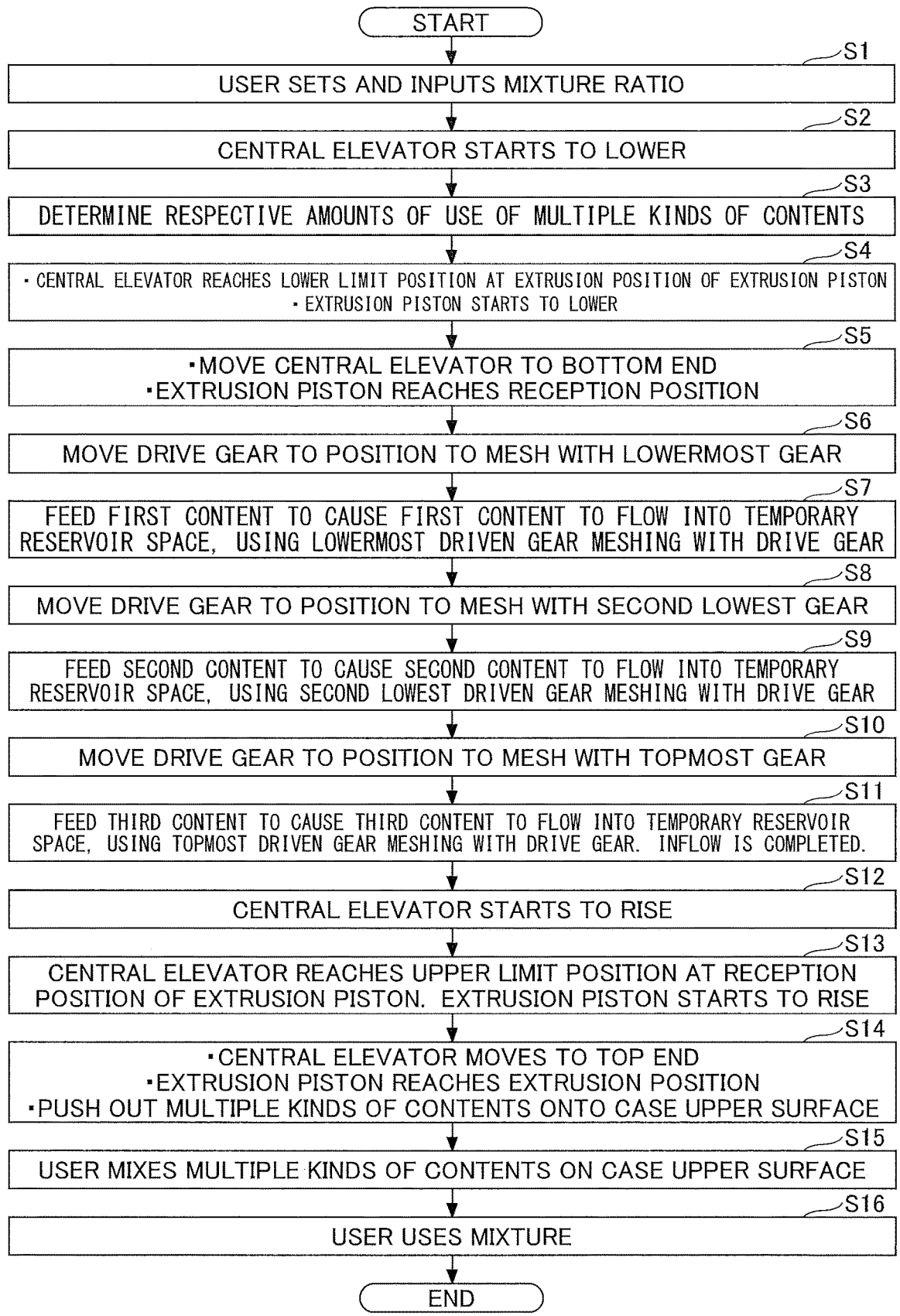
FIG. 19 is a flowchart illustrating an overall flow of a dispensing operation according to the second embodiment.

Next, operation steps in the customizing dispensing system 1000 of the present invention is described using FIGS. 17, 18 and 19. FIG. 17 is a diagram illustrating a state transition in a feeder. FIG. 18 is a timing chart of a dispensing operation in the dispenser 1 according to the first embodiment. FIG. 19 is a flowchart illustrating an overall flow of a dispensing operation in the dispenser 1A according to the second embodiment. It is assumed that the steps of the flow of FIG. 19 are preset by a program stored in the control part 90 of the dispenser 1 or the information processing terminal 200 (300).

At step S1 of FIG. 19, a user sets the mixture ratio of contents and inputs the mixture ratio as a dispensing instruction from the operating part of the information processing terminal 200 (300). While a user inputs information using the network-connected information processing terminal 200 (300) according to this embodiment, operating parts 101 and 102 may be provided in the dispenser as described below to input a dispensing instruction. In this state, the central elevator 3 and the extrusion piston 37 correspond to the state of FIGS. 10A, 10B and 17(a).

In response to the arrival of this dispensing instruction, at step S2, as preparation for a dispensing operation, the pinion gear 31 starts a reversing operation so that the central elevator 3 including the inner piston 36 and the drive gear 21 starts to lower (FIG. 18, at t1).

FIGS. 11 and 17(b) and FIG. 18, at t2, illustrate a state in the middle of lowering.

At step S3, the control part 90 of the dispenser 1 or the information processing terminal 200 (300) determines the respective amounts of use (amounts of dispensing) of multiple kinds of contents based on the set mixture ratio.

At step S4, when the inner piston 36 of the central elevator 3 starts to contact the lower end portion of the extrusion piston 37 at the extrusion position, the extrusion piston 37 starts to move from the extrusion position to the reception position (FIG. 18, at t3).

Specifically, when the lower surface of the inner piston 36 reaches the lower end 37L of the extrusion piston 37 (when the state of FIG. 12, FIG. 17(b) to (c), and FIG. 18, at t3 occurs), the extrusion piston 37 also starts to lower.

Furthermore, at step S5, by lowering the central elevator 3 including the inner piston 36 and the drive gear 21 to the lowermost position, the extrusion piston 37 as well lowers to the reception position together with the inner piston 36 (FIG. 13B, FIG. 17(c) to (d), and FIG. 18, from t3 to t4).

This lowering of the extrusion piston 37 causes the extrusion piston 37 to lower from a position to close the inflow holes 62a through 62d of the central through hole of the cylinder part 6 and move to a position where the lower end of the extrusion piston 37 contacts the stopper 7L at the lower end of the inner cylinder 7 so that the inflow holes 62a through 62d are opened and the temporary reservoir space 61 appears in the central through hole of the cylinder part 6.

The order of steps S3 and S4 may be reversed. That is, the extrusion piston 37 may start to lower before the amounts of the contents used for feeding are determined.

Furthermore, step S3 may be after step S5. That is, when computations, etc., take time, the amounts of the contents used for feeding may be determined after the central elevator 3 is moved to the bottom end and the extrusion piston 37 is caused to reach the reception position.

Thereafter, the central elevator 3 including the inner piston 36 and the drive gear 21 is raised to a position to engage the drive gear 21 with the lowermost driven gear 41 (step S6).

A flow including the step of raising the drive gear 21 to engage the drive gear 21 with a gear after the drive gear 21 is temporarily lowered to the bottom is illustrated at steps S5 and S6 of FIG. 19. In the case of a structure where the bottom end position of the central elevator 3 coincides with a position where the drive gear 21 engages with the lowermost gear as illustrated in FIGS. 13, 17(d) and 18, however, the step of rising from the bottom end to the lowermost gear at S6 may be omitted, and the drive gear 21 may start to mesh with the driven gear and rotate when reaching the bottom end.

It is assumed that when the lowermost driven gear 41 rotates to eject no content for feeding in the structure as illustrated in FIG. 13A, where the bottom end position of the central elevator 3 coincides with a position where the drive gear 21 engages with the lowermost gear, the central elevator 3 is temporarily lowered to the bottom end position to move the extrusion piston 37 to the reception position.

By the lowermost driven gear 41 meshing with the drive gear 21, a first content is transferred to flow into the temporary reservoir space 61 (step S7, FIG. 18, from t5 to t6).

After the time immediately after the start of use, the contents fed at the time of previous use have reached up to the nozzle passages 64 of the nozzles 63 over the head part 52. Therefore, at times other than immediately after the start of use, when the central elevator 3 moves to locate the extrusion piston 37 at the reception position to open the inflow holes 62a through 62e at S5, the contents of multiple kinds immediately flow from the inflow holes 62a through 62e into the temporary reservoir space 61. The same immediate inflow is the case with steps S9 and S11.

In order to avoid the drive gear 21 meshing with the driven gears 41 through 44 and rotating during the rising or lowering operation of the drive gear 21, the drive gear 21 is rotated a short interval after the end of rotating the pinion gear 31 (FIG. 18, from t4 to t5, from t8 to t9, and from t12 to t13).

Therefore, the central elevator 3 including the inner piston 36 and the drive gear 21 is raised to a position to mesh the drive gear 21 with the second lowest driven gear 42 (step S8 and FIG. 18, from t7 to t8).

In order to avoid the drive gear 21 rising while meshing with the driven gears 41 through 44 and rotating, the pinion gear 31 is rotated a short interval after the end of rotating the drive gear 21 (FIG. 18, from t6 to t7, from t10 to t11, and from t14 to t15).

By the second lowest driven gear 42 meshing with the drive gear 21, a second content is transferred to flow into the temporary reservoir space 61 (step S9, FIG. 18, from t9 to t10).

Here, as illustrated by the periods of rotation of the drive gear 21 of FIG. 18 (from t5 to t6, from t9 to t10, and from t13 to t14), by varying and setting the period of rotation of the drive gear 21 according to the amount of use, the feed time changes, so that the amount of a content to be fed can be adjusted.

Thereafter, the central elevator 3 including the inner piston 36 and the drive gear 21 is raised to move the drive gear 21 to a position to mesh with the topmost driven gear (step S10, FIGS. 14A, 14B and 17(e) and FIG. 18, from t11 to t12)).

By the topmost gear meshing with the drive gear 21, the fifth content is fed to flow into the temporary reservoir space 61 (step S11 and from t13 to t14). As a result, the flowing of the contents into the temporary reservoir space 61 ends to complete the inflow operation.

Thus, the contents flow from the inflow holes 62a through 62d (62e) into the temporary reservoir space 61 one by one in order with timing that differs between the contents.

FIGS. 18 and 19 illustrate an example where three kinds of contents are caused to flow in at S6 through S11, while the number of kinds of contents may be two, four, five, or the like.

When the contents to be used increase, the distance of rising along the position of the driven gears illustrated at S6, S8 and S10 is adjusted, and the feed time for moving the content and causing the content to flow in as illustrated at S7, S9 and S11 is appropriately provided.

After the inflow is completed at step S11, at S12, the central elevator 3 including the inner piston 36 and the drive gear 21 is raised to an upper limit value at the reception position of the extrusion piston 37 where the inner piston 36 starts to contact the lower surface of the upper end 37U of the extrusion piston 37 (FIGS. 15A, 15B and 17(f) and FIG. 18, from t15 to t16).

At step S13, when the lower surface of the upper end 37U of the extrusion piston 37 is in contact with the upper surface of the inner piston 36, the extrusion piston 37 starts to rise together with the central elevator 3 including the inner piston 36 and the drive gear 21.

At step S14, as the central elevator 3 rises, the extrusion piston 37 in contact with the inner piston 36 moves from the reception position to the extrusion position to push out the multiple kinds of contents that have flown into the temporary reservoir space 61 onto the upper surface (case upper surface) 11U of the device case 10 (FIGS. 10A and 10B, from FIG. 17(f) to FIG. 17(a), and FIG. 18, from t16 to t17).

That is, as the extrusion piston 37 moves, the contents in the temporary reservoir space 61, sitting on the upper surface of the upper end 37U of the extrusion piston 37, are pushed out to the same level as the upper surface 11U that is the dispensing surface of the device case 10.

The user mixes the multiple kinds of contents on the upper surface 11U of the top case 11 (step S15), and thereafter uses the mixture (step S16).

Thus, according to a dispenser of the present invention, as a result of sharing a motor for multiple purposes, the number of motors required for driving four (five) feed containers is two. Therefore, compared with the configuration of providing motors one for each feed container, the number of motors can be reduced. Therefore, a space required for motor placement becomes unnecessary, so that size can be reduced. Furthermore, the component cost of motors can be reduced.

Furthermore, because the number of motors necessary in the dispenser is reduced compared with the configuration of providing motors one for each feed container, it is possible to use one of higher performance, for example, a servomotor or a motor with an angle feedback mechanism, without incurring an increase in cost compared with the configuration of providing motors one for each container, so that it is possible to more accurately control the rotation angle of the drive gear. As a result, it is possible to more accurately adjust the amounts of ejection of the respective contents of the feed containers controlled based on the rotation angle of the drive gear (the periods of rotation of FIG. 18, from t5 to t6, from t9 to t10, and from t13 to t14).

According to the first and the second embodiment illustrated in FIGS. 2 through 15B, the multiple kinds of contents reach the same position as the upper surface 11U of the device case 10, sitting on the upper surface of the upper end 37U of the extrusion piston 37, without being mixed and under hardly any pressure in the temporary reservoir space 61. Therefore, the user enjoys mixing the contents by herself/himself. In this case, according to the first embodiment, because the depression 15 is formed around the opening 14 in the upper surface 11U that is the dispensing surface of the device case 10, the user finds it efficient to mix the pushed-out contents inside the edge of the depression 15 using the depression 15 as a saucer.

Furthermore, when the mixture is adhered on the upper surface 11U that is the exterior of the dispenser 1 after the above-described flow, it is more preferable that the user suitably wipe off the adhered object with a tissue or the like.

Third Embodiment

Figure 20:
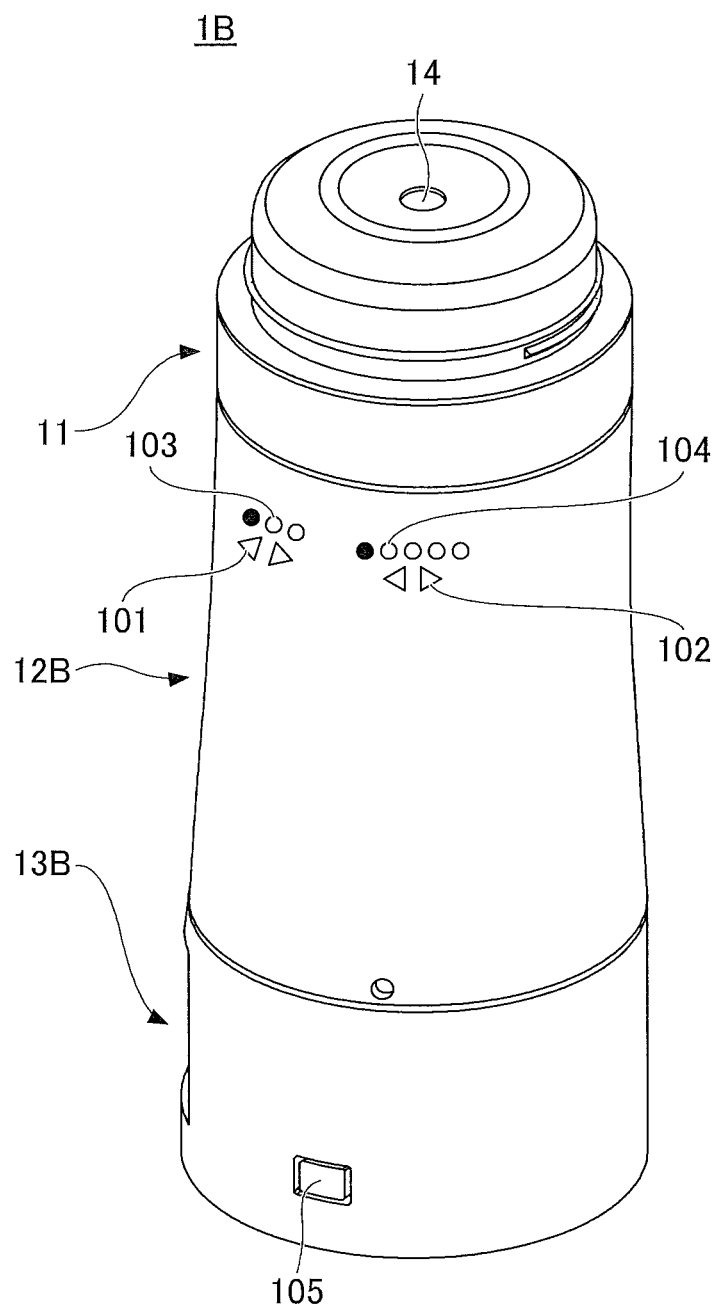
FIG. 20 is an exterior view of a feeder according to a third embodiment of the present invention.

FIG. 20 is an exterior view of a dispenser according to a third embodiment of the present invention. According to this embodiment, by way of example, the operating parts (operating switches) 101 and 102, lighting parts 103 and 104, and a power switch 105 are provided in the device case of a dispenser 1B.

The left operating part 101 illustrated in FIG. 20 adjusts the amount of dispensing (mixture proportion) of a content to be dispensed. Furthermore, the right operating part 102 selects a target of amount adjustment, and the lighting part 104 indicates information on the kind of a content whose amount is to be adjusted by the left operating part 102. The lighting part 103 lights up to indicate the selected amount of dispensing selected by the operating part 101. The example of FIG. 20 shows a display example where the amount of dispensing can be selected from among three levels.

While two sets of an operating part and a lighting part are depicted in FIG. 20, three or more of these operating sets may be provided in the dispenser 1. For example, operating parts may be independently provided one for each content.

According to the configuration of selecting the amount of dispensing from among three levels as illustrated in FIG. 20, for example, no light, one light, two lights, and three lights in the lighting part 103 indicate "NO DISPENSING", "SMALL AMOUNT OF DISPENSING", "MEDIUM AMOUNT OF DISPENSING", and "LARGE AMOUNT OF DISPENSING", respectively, of the content.

The number of the operating parts 101 and 102 may increase or decrease according to the number of kinds of contents in the dispenser 1. Furthermore, the operating parts 101 and 102, which is illustrated as having a triangular shape in FIG. 20, may have other shapes to the extent that the amount of dispensing of a content can be operated. Furthermore, function buttons, provided one for each of increasing and decreasing indicated by the direction of a triangle as an operating part for selecting, may be integrated into a single button that changes only in the direction of, for example, increasing.

Furthermore, the buttons illustrated in FIG. 20 may be either projecting push buttons or flat touch sensors provided in a case surface. Alternatively, a touchscreen may be provided in place of button-type operating parts.

The power switch 105 turns on and off the dispenser 1B.

Fourth Embodiment

Figure 21:
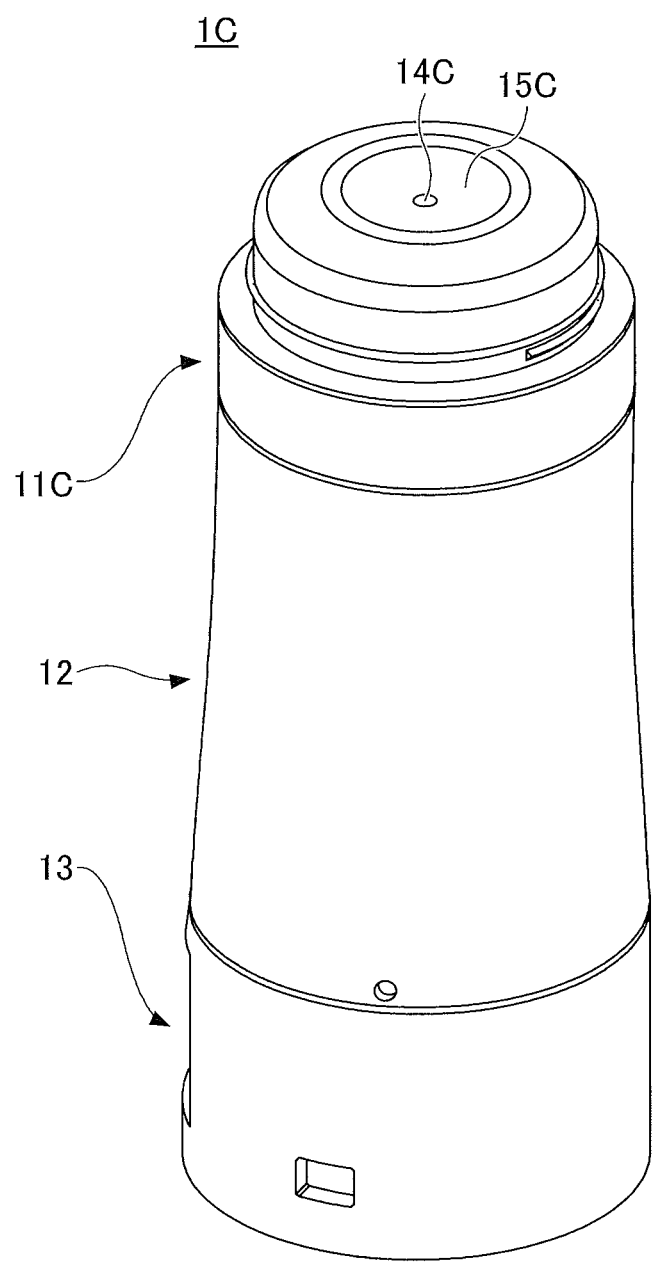
FIG. 21 is an exterior view of a feeder according to a fourth embodiment of the present invention.

FIG. 21 is an exterior view of a dispenser according to a fourth embodiment of the present invention. A dispenser 1C of this embodiment is different from FIG. 8 in that the opening in the upper surface is smaller.

According to this embodiment, the diameter of an opening 14C is small. Accordingly, multiple kinds of contents to be dispensed are carried onto a depression 15C that is a dispensing surface after receiving pressure. Accordingly, according to the dispenser 1C of this embodiment, the contents are pushed out while being slightly mixed.

Accordingly, a user can enjoy the slightly mixed dispensing objects being gradually ejected, and also can reduce time required for mixing the contents pushed out from the opening 14C that is a dispensing hole on the depression 15C that is a dispensing surface.

FIG. 21 illustrates an example where the opening that is the dispensing hole of the device is small and operation is performed by an information processing terminal connected via a network, while operating parts may be provided in the body of the dispenser 1C as illustrated in FIG. 20 in a configuration where the opening that is a dispensing hole is small.

Fifth Embodiment

Figure 22:
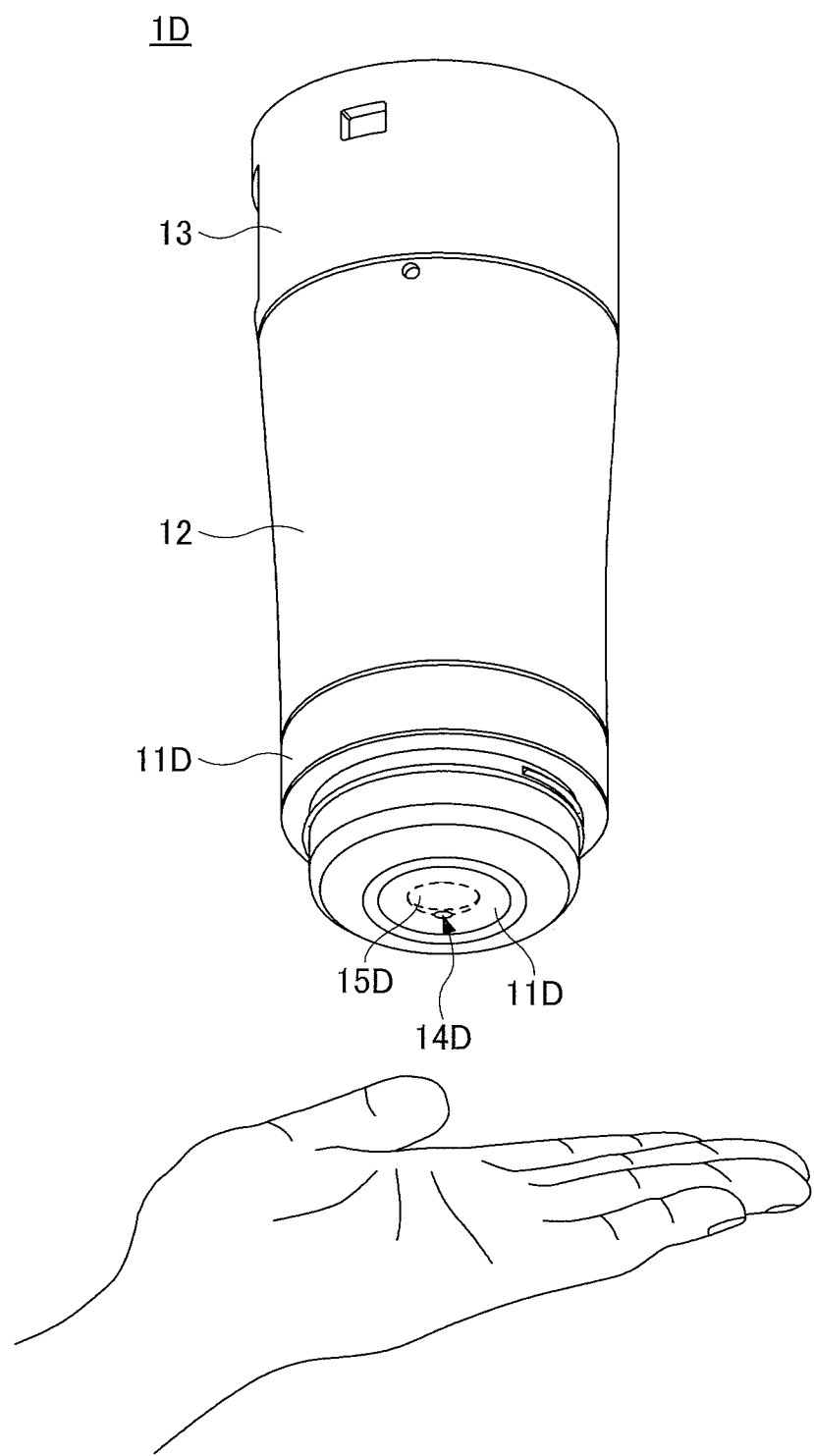
FIG. 22 is an exterior view of a feeder according to a fifth embodiment of the present invention.

FIG. 22 is an exterior view of a dispenser according to the fifth embodiment of the present invention, illustrating its usage.

While the above-described examples illustrate examples where the dispensers 1, 1A, 1B and 1C are placed such that dispensing is performed upward, according to a dispenser of the present invention, the direction of dispending is not limited to the upward direction and dispensing may be performed downward as illustrated in FIG. 22.

In the case of placing a dispenser 1D such that dispensing is performed downward as illustrated in FIG. 22, dispensing may be performed onto a user's hand and mixing may be performed on the palm the same as in the case of an installed hand washer.

According to this embodiment, an example where the dispensing surface where an opening 14D of a small diameter is a lower surface 11D of a device case 10D is illustrated. Therefore, the extrusion piston 37 inside can vertically move up and down between a lower extrusion position and an upper reception position. According to this configuration, the extrusion piston 37 is at the lower extrusion position and the surface of the lower surface 11D that is a dispensing surface and the lower surface of the extrusion piston 37 are substantially at the same level, when the power is turned off, or after dispensing or at the standby position with the power turned on.

Furthermore, as the operating tubes 54 rotate, the feed pistons 57 lower from top to bottom in the feed containers 5a through 5e to push out the contents from the feed outlets 58, which are at the lower ends of the head parts 52 provided on the lower side, into the temporary reservoir space (not depicted) in the lower center of the cylinder part via the nozzles 63a through 63d extending substantially horizontally.

Here, as the dispenser 1D performs dispensing downward, the contents preferably have high viscosity in view of gravity. Furthermore, according to this embodiment, in view of gravity, the opening 14D is preferably smaller in diameter than the temporary reservoir space 61 with which the opening 14D communicates as illustrated in FIG. 21.

Furthermore, in the case of downward dispensing as illustrated in FIG. 22, an area around the opening 14D in the lower surface 11D is preferably a mound-shaped protrusion 15D instead of being depressed like a mortar as in the first through fourth embodiments.

FIG. 22 illustrates an example where dispensing is performed downward and operation is performed by an information processing terminal connected via a network, while operating parts may be provided in the body of the dispenser 1D as illustrated in FIG. 20 in a configuration where dispensing is performed downward.

While FIG. 22 illustrates a configuration of downward dispensing, the direction of dispensing is not limited to the upward or the downward direction, and may be a sideward direction.

According to the third through fifth embodiments as well, according to a dispenser of the present invention, as a result of sharing a motor for multiple purposes, the number of motors required for driving four (five) feed containers is two. Therefore, compared with the configuration of providing motors one for each feed container, the number of motors can be reduced. Therefore, a space required for motor placement becomes unnecessary, so that size can be reduced. Furthermore, the component cost of motors can be reduced.

Furthermore, because the number of motors necessary in the dispenser is reduced compared with the configuration of providing motors one for each feed container, it is possible to use one of higher performance, for example, a servomotor or a motor with an angle feedback mechanism, without incurring an increase in cost compared with the configuration of providing motors one for each container, so that it is possible to more accurately control the rotation angle of the drive gear. As a result, it is possible to more accurately adjust the amounts of ejection of the respective contents of the feed containers controlled based on the rotation angle of the drive gear.

According to the above-described embodiments, examples where four or five feed containers are provided in a dispenser are described. The number of feed containers provided in a dispenser, however, may be any number that is two or more. The superiority of the above-described motor cost and high performance increases as the number of feed containers increases relative to conventional dispensers where motors are provided one for each container.

Contents (cosmetics) of different colors are described above as the contents, while contents or the like of different textures may be used as the contents, for example.

For example, in the case of dispensing a basic cosmetic using contents or the like of different textures, by selecting information such as "refreshing," "moist," "normal," "sensitive," "whitening," "acne treatment," or "pack" in the information processing terminal 200 (300) according to skin conditions, the temperature and moisture of outside air, or the mood of a user, the mixture ratio of the contents that can provide a skin feel suitable for the selection is calculated. The contents of different textures are composition ingredients that affect viscosity. As the contents of different textures, contents dedicated to different functions, such as a basic ingredient, a thickening ingredient (moisturizing ingredient), an astringent ingredient, a whitening ingredient (such as vitamin C), and an anti-acne ingredient, are pre-stored.

The calculated information is transmitted to the dispenser 1, and the dispenser 1 simultaneously dispenses the contents of different viscosities (feels on the skin) with a predetermined mixture ratio based on the information. The dispensed contents are mixed into a basic cosmetics that produce predetermined effects.

Furthermore, in the case of dispensing a base makeup cosmetic using contents or the like of different light reflectances, it may be made possible to make suitable selection by selecting "natural," "glossy (shining)," or "matt" according to skin conditions, the temperature and moisture of outside air, or the mood of a user, such that cosmetics that have the same color but differ in the reflectance of light on the skin are dispensed by adjusting the mixture ratio of the contents.

According to the above-described dispensers of the present invention, the contents are separately stored and transferred before reaching the temporary reservoir space 61. Therefore, it is possible to use the contents that tend to separate or degrade when left unattended without separation or degradation by mixing the contents immediately before their use. For example, cosmetics containing vitamin C, hair styling products, etc., may be considered as examples of the above.

Furthermore, while the above description is given, assuming that a user uses a dispenser according to the present invention at home, suitably making a selection, the above-described dispensers are also suitable for use at a counter in a store. Contents of a mixture ratio according to the complexion and taste of each customer visiting the store can be set each time by adjusting the mixture ratio at the counter.

Furthermore, while the above description is given, taking a cosmetic product that causes a visual change as an example as the contents, scented liquid or viscous substances (such as perfumes or body cream or hand cream serving as a kneaded perfume) may be contained as the contents. By causing perfumes or kneaded perfumes to be the contents, a user can customize a scent.

Furthermore, while the above description is given, taking a cosmetic product as an example as the contents, liquid or viscous condiments may be contained as the contents. By containing condiments, a user can customize flavor or prepare the amounts of condiments used for cooking without using a measure.

Preferred embodiments of the present invention are described in detail below. The present invention, however, is not limited to the particular embodiments, and variations and modifications may be made without departing from the scope of the subject matter of the embodiments of the present invention recited in the claims.

The present invention is based upon and claims priority to Japanese patent application No. 2018-169201, filed with the Japan Patent Office on Sep. 10, 2018, the entire contents of which are hereby incorporated herein by reference.

DESCRIPTION OF THE REFERENCE NUMERALS

1, 1A, 1B, 1C, 1D dispenser
10 device case
11, 110 top case
11U upper surface (dispensing surface, case upper surface)
14 opening
16 beam part
18 support tube
20 feed drive motor (first drive source)
21 drive gear
22 transmission shaft
3 (3A) central elevator
30 elevation drive motor (second drive source)
31 pinion gear
32 rack gear
33 central tube
34 engagement part
35 (35A) piston rod
36 (36A) inner piston
37 (37A) extrusion piston
37U upper end (top)
37L lower end
41, 42, 43, 44 driven gear
5 (5a, 5b, 5c, 5d, 5e) feed container
51 body tube (container tube)
52 head part (container tube)
53 feed part
54 (54a, 54b, 54c, 54d, 54e) operating tube (feed tube)
55 movable shaft
56 rotating restricting part
57 feed piston
58 feed outlet
6 cylinder part
61 through hole, temporary reservoir space
62 (62a, 62b, 62c, 62d) inflow hole
63 (63a, 63b, 63c, 63d, 63e) nozzle
GA selective spur gear mechanism
GB rack and pinion mechanism

The invention claimed is:
1. A feed drive mechanism comprising:
a plurality of feed containers configured to feed contents with rotation of rotatable feed tubes provided in lower portions of container tubes containing the contents;

a plurality of gears connected to the feed tubes of the plurality of feed containers, the plurality of gears being at different heights; and a single drive gear configured to vertically move and mesh with the plurality of gears, wherein the drive gear is configured to selectively mesh with and rotate the plurality of gears to cause the plurality of feed containers to feed the contents with timing that differs between the plurality of feed containers.

2. The feed drive mechanism as claimed in claim 1, wherein the drive gear is configured to selectively mesh with and rotate the plurality of gears by changing a height of the drive gear.

3. The feed drive mechanism as claimed in claim 2, further comprising:

a first drive source configured to rotate the drive gear;

a rack and pinion mechanism configured to change the height of the drive gear; and a second drive source configured to drive the rack and pinion mechanism.

4. The feed drive mechanism as claimed in claim 3, wherein the drive gear is held below a vertically extending rack gear in such a manner as to be rotatable relative to the rack gear, and the rack gear is configured to vertically move by meshing with a pinion gear driven by the second drive source.

5. The feed drive mechanism as claimed in claim 4, further comprising:

a cylinder part having a through hole into which the contents ejected from the plurality of feed containers are allowed to flow; and an extrusion piston configured to move between an extrusion position and a reception position and contact the contents in the through hole.

6. The feed drive mechanism as claimed in claim 5, further comprising:

an inner piston connected to the rack gear and configured to vertically move together with the extrusion piston and vertically move relative to the extrusion piston within an internal space of the extrusion piston.

7. A dispenser comprising:

the feed drive mechanism as claimed in claim 3; and a control part configured to control the first drive source and the second drive source.

8. The dispenser as claimed in claim 7, wherein the contents are a cosmetic, soap, toothpaste, or a perfume in fluid or paste form.

9. A customizing dispensing system, comprising:

the dispenser as claimed in claim 8; and an information processing terminal configured to connect to the dispenser via a network, wherein the info illation processing terminal is configured to give instructions on amounts of ejection of the contents.

10. A method of controlling a feed drive mechanism, the feed drive mechanism including a plurality of feed containers configured to feed contents with rotation of rotatable feed tubes provided in lower portions of container tubes containing the contents, a plurality of gears connected to the feed tubes of the plurality of feed containers, a single drive gear configured to mesh with the plurality of gears, and a rack and pinion mechanism configured to change a height of the drive gear, the method comprising:

causing the drive gear to selectively mesh with and rotate a first gear among the plurality of gears to feed a content in a first feed container among the plurality of feed containers;

causing the rack and pinion mechanism to change the height of the drive gear; and causing the drive gear to selectively mesh with and rotate a second gear among the plurality of gears to feed a content in a second feed container among the plurality of feed containers.

11. The method as claimed in claim 10, wherein the feed drive mechanism further includes a cylinder part having a through hole into which the contents ejected from the plurality of feed containers are allowed to flow, an extrusion piston configured to move between an extrusion position and a reception position and contact the contents in the through hole, and an inner piston connected to a rack gear of the rack and pinion mechanism and configured to vertically move together with the extrusion piston and vertically move relative to the extrusion piston within an internal space of the extrusion piston, the method further comprising:

causing the rack and pinion mechanism to move the inner piston with the extrusion piston remaining at the extrusion position;

causing the rack and pinion mechanism to move the inner piston and move the extrusion piston from the extrusion position to the reception position;

causing the rack and pinion mechanism to change the height of the drive gear by moving the inner piston with the extrusion piston remaining at the reception position; and causing the rack and pinion mechanism to move the inner piston and move the extrusion piston from the reception position to the extrusion position.

* * * * *